US010514826B2

(12) United States Patent
Bai et al.

(10) Patent No.: US 10,514,826 B2
(45) Date of Patent: Dec. 24, 2019

(54) CONTEXTUAL COMMAND BAR

(71) Applicant: Microsoft Technology Licensing, LLC, Redmond, WA (US)

(72) Inventors: Annie Y. Bai, Seattle, WA (US); Ruth Kikin-Gil, Bellevue, WA (US); Derek V. Snook, Redmond, WA (US); Han-Yi Shaw, Redmond, WA (US); Maya Rodrig, Seattle, WA (US); Kara Fong, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 213 days.

(21) Appl. No.: 15/095,434

(22) Filed: Apr. 11, 2016

(65) Prior Publication Data
US 2017/0228106 A1    Aug. 10, 2017

Related U.S. Application Data

(60) Provisional application No. 62/292,471, filed on Feb. 8, 2016.

(51) Int. Cl.
*G06F 3/00* (2006.01)
*G06F 3/0482* (2013.01)
*G06F 3/0484* (2013.01)
*G06F 3/0485* (2013.01)
*G06F 3/0488* (2013.01)

(52) U.S. Cl.
CPC .......... *G06F 3/0482* (2013.01); *G06F 3/0485* (2013.01); *G06F 3/0488* (2013.01); *G06F 3/04842* (2013.01)

(58) Field of Classification Search
CPC ..... G06F 9/4443; G06F 3/0486; G06F 3/0236
USPC ........................................ 715/773, 769, 810
See application file for complete search history.

(56) References Cited

U.S. PATENT DOCUMENTS

| 6,384,849 | B1 | 5/2002 | Morcos et al. |
| 7,610,562 | B2 | 10/2009 | Rockey et al. |
| 7,987,427 | B1* | 7/2011 | Gough .................... G06F 9/453 715/762 |
| 2010/0318929 | A1* | 12/2010 | Hilton .................... G06F 3/0486 715/769 |

(Continued)

FOREIGN PATENT DOCUMENTS

| EP | 1358544 A2 | 11/2003 |
| EP | 1840706 A1 | 10/2007 |

(Continued)

OTHER PUBLICATIONS

International Search Report and Written Opinion for International Patent Application No. PCT/US2017/015920, dated May 31, 2017, date of filing: Feb. 1, 2017, 16 pages.

(Continued)

*Primary Examiner* — Andrey Belousov
(74) *Attorney, Agent, or Firm* — Christopher J. Volkmann; Kelly, Holt & Christenson, PLLC

(57) ABSTRACT

A user input is detected that triggers a contextual command bar to be surfaced. A commanding context, in an application that the user has open, is identified and a set of commands to be surfaced in the contextual command bar is identified, based upon the context. The identified set of commands is surfaced on the contextual command bar for user interaction.

19 Claims, 21 Drawing Sheets

(56) References Cited

U.S. PATENT DOCUMENTS

| | | | |
|---|---|---|---|
| 2013/0019174 A1 | 1/2013 | Gil et al. | |
| 2013/0019175 A1 | 1/2013 | Kotler et al. | |
| 2013/0174079 A1* | 7/2013 | Morley | G06F 3/0236 715/773 |
| 2013/0191781 A1* | 7/2013 | Radakovitz | G06F 9/4443 715/810 |
| 2015/0248201 A1 | 9/2015 | Shankar et al. | |
| 2015/0378600 A1 | 12/2015 | Sloan et al. | |

FOREIGN PATENT DOCUMENTS

| | | |
|---|---|---|
| WO | WO 2013/010155 A2 | 1/2013 |
| WO | 2013109661 A1 | 7/2013 |
| WO | 2014110462 A1 | 7/2014 |
| WO | 2014130329 A1 | 8/2014 |

OTHER PUBLICATIONS

Cox, David A.: "Pages for iOS Full Tutorial", youtube, Jun. 20, 2014, Retrieved from the Internet URL:https://www.youtube.com/watch?v=kmj04zNS6u8, Retrieved on May 3, 2017, 4 pages.

Larkin, John: "Pages Creating documents, projects & posters on the iPad", Jan. 1, 2013, Retrieved from the internet: URL:http://www.larkin.net.au/resources/pages_guide.pdf, Retrieved on Apr. 26, 2017, 18 pages.

Anonymous: "Hands-on with the new, free-to-use Office for iPhone apps", Nov. 28, 2014, http://arstechnica.com/apple/2014/11/hands-on-with-the-new-free-to-use-office-for-iphone-apps/ Retrieved from the internet:URL:http//web.archive.org/web/20141128033338/http://arstechnica/.com/apple/2014/11/hands-on-with-the-new-free-to-use-office-for-iphone-apps Retrieved on Apr. 27, 2016, 4 pages.

Hughes, Neil: "Inside iOS 9: Apple's QuickType keyboard gains quick cut, copy, paste & more on iPad", appleinsider, Jun. 15, 2015, Retrieved from the Internet: URL:http://appleinsider.com/articles/inside-ios-9-apples-quicktype-keyboard-gains-quick-cut-copy-paste-more-on-ipad Retrieved Apr. 26, 2017, 4 pages.

"Toolbars", Published on: Jul. 26, 2014 Available at: https://msdn.microsoft.com/en-us/library/windows/desktop/dn742395(v=vs.85).aspx.

"Guidelines for command bars", Retrieved on: Feb. 5, 2016 Available at: https://msdn.microsoft.com/en-in/library/windows/apps/hh465302.aspx.

"Menus and Commands for Visual Studio", Retrieved on: Feb. 5, 2016 Available at: https://msdn.microsoft.com/en-us/library/mt162309.aspx.

"Guidelines for Context Menus", Retrieved on: Feb. 5, 2016 Available at: https://msdn.microsoft.com/en-in/library/windows/apps/hh465308.aspx.

* cited by examiner

CONTEXTUAL COMMAND BAR

CROSS-REFERENCE TO RELATED APPLICATION

The present application is based on and claims the benefit of U.S. provisional patent application Ser. No. 62/292,471, filed Feb. 8, 2016, the content of which is hereby incorporated by reference in its entirety.

BACKGROUND

Computer systems are currently in use. Such computer systems often run applications that are used in generating content. For instance, some applications include word processing applications, slide presentation applications, spreadsheet applications, among others.

In such computing systems, users can perform a wide variety of different types of commands on content that are created with these types of applications. For instance, when a user highlights a word in a word processing document, the user can perform a variety of different types of direct commands on that highlighted text, such as to bold the text, underline the text, italicize the text, copy the text, etc. Users sometimes perform these commands by actuating user actuated elements, corresponding to the commands, that are displayed on a commanding surface. In one example, a commanding surface is also referred to as a commanding palette. The commanding palette is a display surface (or user interface display) that has a plurality of different tabs. Each tab, when actuated, displays a corresponding set of command actuators. When the user actuates one of the command actuators, the application performs a corresponding command on a selected item, such as on highlighted text, etc.

Some computing systems are deployed on mobile devices, such as on smart phones, tablet computers, etc. Such mobile devices often have limited display real estate so the commanding palette is often collapsed, by default, in order to reserve room in the display real estate to show the user's content. Also, in such applications, the commanding palette is not displayed along with the keyboard. Therefore, when a user wishes to perform any of a wide variety of different commands, the user may normally need to first provide an input to dismiss the keyboard, and then provide another input to invoke the commanding palette. The user must then perform the different actions needed to actuate an actuator on the commanding palette, in order to perform an operation on a selected item of content. This can make even simple tasks, such as highlighting text, cropping a picture, or adding a column to a table, slow and cumbersome. This also makes tasks that interleave typing and formatting particularly inefficient.

Even after the user has provided the inputs so that the commanding palette is displayed, the user interaction is still cumbersome. The user still needs to select a desired tab and then scroll through the palette (which is often arranged vertically) in order to identify and select a command that the user wishes to perform.

The discussion above is merely provided for general background information and is not intended to be used as an aid in determining the scope of the claimed subject matter.

SUMMARY

A user input is detected that triggers a contextual command bar to be surfaced. A commanding context, in an application that the user has open, is identified and a set of commands to be surfaced in the contextual command bar is identified, based upon the context. The identified set of commands is surfaced on the contextual command bar for user interaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
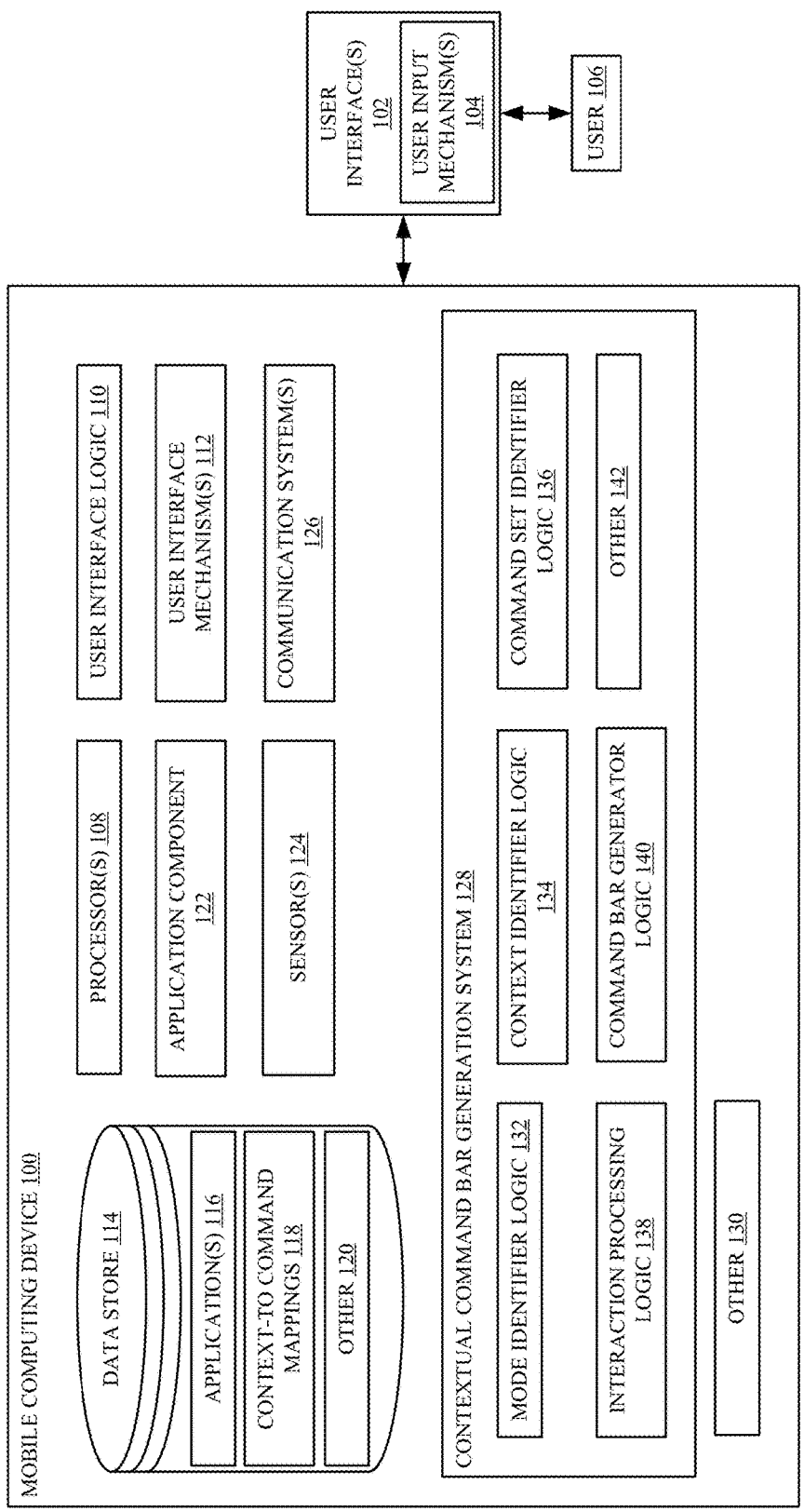
FIG. 1 is a block diagram of one example of a mobile computing device with a contextual command bar generation system.

FIG. 1 is a block diagram of one example of a mobile computing device 100. Device 100 is shown, in the example in FIG. 1, generating user interfaces 102 with user input mechanisms 104 for interaction by user 106. User 106 illustratively interacts with user input mechanisms 104 in order to control and manipulate mobile computing device 100.

Mobile computing device 100 illustratively includes one or more processors 108, user interface logic 110, user interface mechanisms 112, data store 114 (which, itself, can include applications 116, context-to-command mappings 118, and a wide variety of other items 120), application component 122, one or more sensors 124 and one or more communication systems 126. Mobile computing device 100 can also illustratively include contextual command bar generation system 128 and a wide variety of other items 130. Contextual command bar generation system 128, itself, can illustratively include mode identifier logic 132, context identifier logic 134, command set identifier logic 136, interaction processing logic 138, command bar generator logic 140, and it can include other items 142. Before describing the overall operation of mobile computing device 100, a brief overview of some of the items in mobile computing device 100, and their operation, will first be provided.

User interface mechanisms 112 can be a wide variety of different mechanisms. For instance, they can be buttons, switches, keypads, thumb pads, a touch sensitive display screen, speech recognition components, or a wide variety of other mechanisms. In one example, user interface logic generates user interfaces 102 with user input mechanisms 104 that include user actuatable display elements, such as icons, links, touch sensitive buttons, etc. Logic 110 illustratively detects user inputs through mechanisms 112 and 104 and performs various actions or generates other user interfaces, based upon those interactions.

Application component 122 illustratively runs applications 116. Applications 116 can include a wide variety of applications, such as word processing applications, slide presentation applications, spreadsheet applications, or other applications in which user 106 can generate or modify content.

Sensors 124 can include a wide variety of different sensors. For instance, sensors 124 can include one or more accelerometers, geographic location sensors (such as a global positioning system receiver), proximity sensors, or a wide variety of other sensors. The sensors illustratively generate sensor signals indicative of sensed variables and provide those signals to various other items, logic or components in computing device 100 or elsewhere.

Communication systems 126 can include any of a wide variety of different communication systems. For instance, they can include cellular communication systems, near field communication systems, Internet communication systems, or a variety of other wired or wireless communication systems.

Contextual command bar generation system 128 illustratively detects a context that user 106 is operating in, in one or more of the applications 116, and determines whether to surface a contextual command bar. The contextual command bar illustratively has actuators that can be actuated by user 106 in order to perform commands that are relevant to the identified context. In one example, system 128 only surfaces the contextual command bar when the user is operating an application in one or more of a variety of different operational modes. For instance, when the user 106 is in a mode where the user is primarily consuming information (such as reading a document, presenting a slide presentation, etc.), then it may be that system 128 does not surface the contextual command bar so that the display screen on mobile device 100 has more display real estate to show the content being consumed. However, when the user is in, for instance, an editing mode, then system 128 may surface the contextual command bar. Thus, mode identifier logic 132 identifies the mode in which the user is using the application, and context identifier logic 134 identifies the context of the application. Command set identifier logic 136 identifies a set of commands that are to be displayed on the contextual command bar, given the identified context. Command bar generator logic 140 generates a representation of the command bar and provides it to user interface logic 110 for surfacing, for user interaction. Interaction processing logic 138 detects user interactions with the contextual command bar (which may be directly detected, or indicated by logic 110, or otherwise) and performs various actions based on those interactions.

Figure 2A:
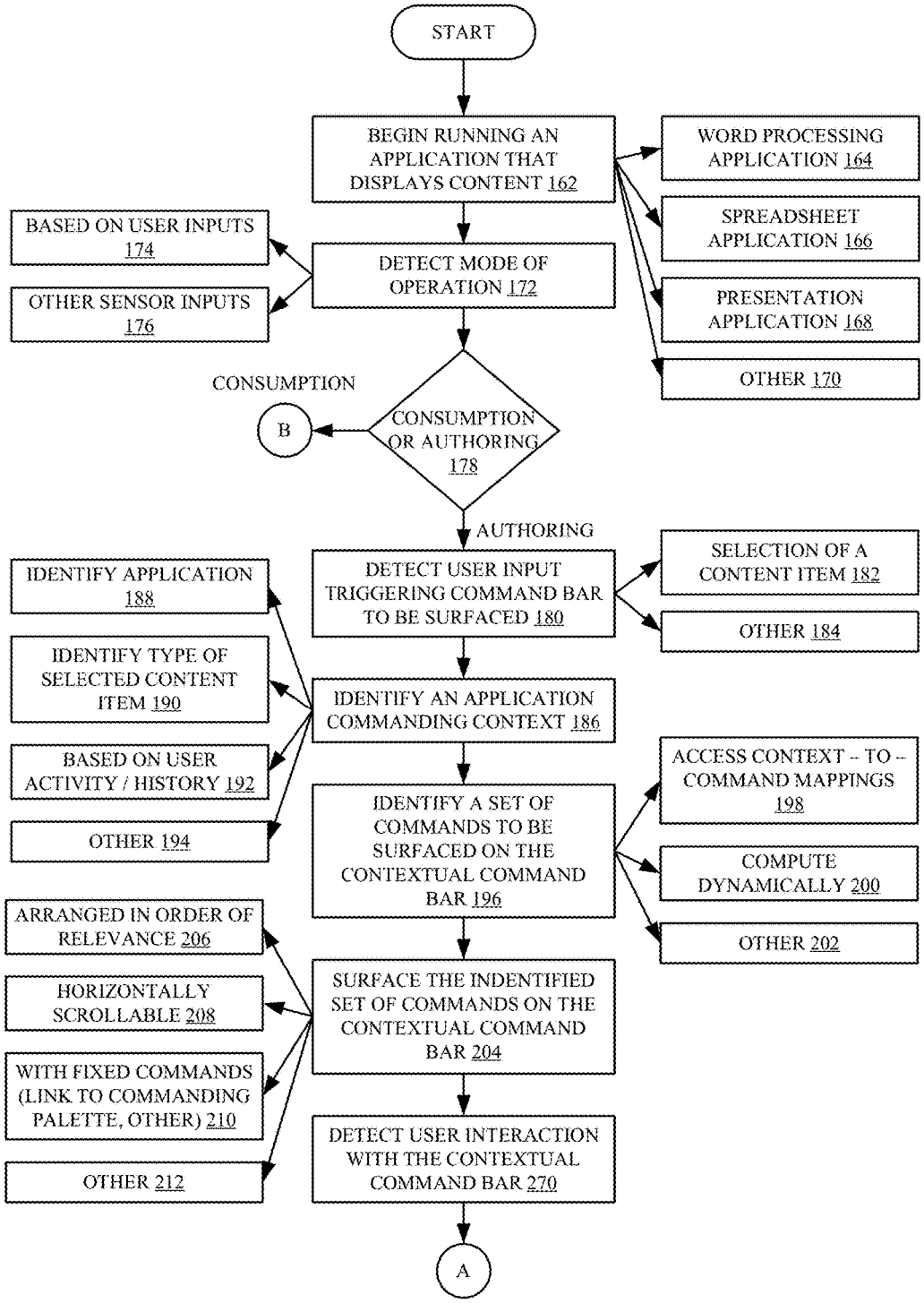
FIGS. 2A and 2B (collectively referred to herein as FIG. 2) show a flow diagram illustrating one example of the operation of the mobile computing device shown in FIG. 1.
Figure 2B:
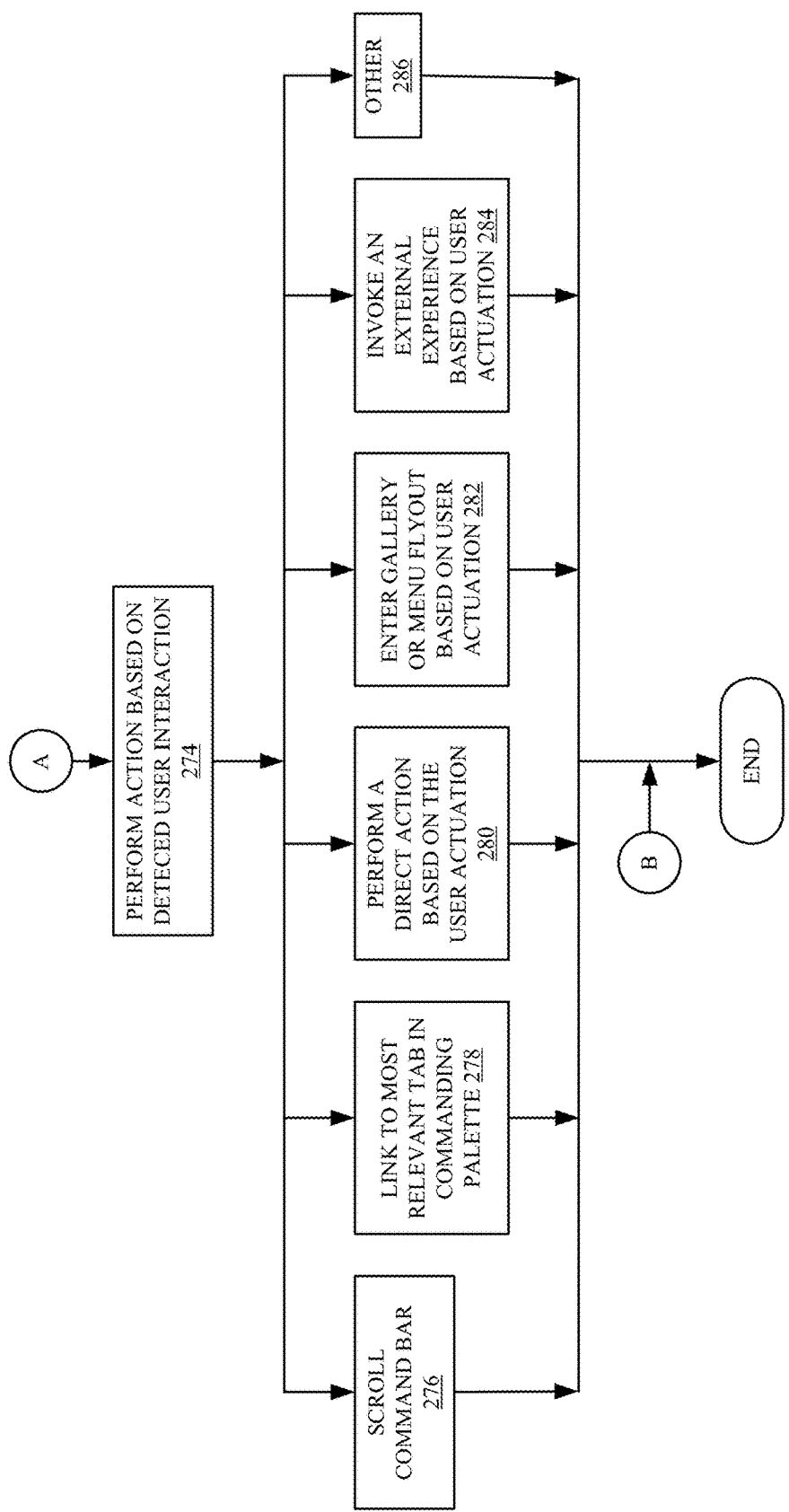

FIGS. 2A and 2B (collectively referred to herein as FIG. 2) show a flow diagram illustrating one example of the operation of mobile computing device 100 in generating a contextual command bar, and processing user interactions with the contextual command bar. It is first assumed that user 106 provides inputs to mobile computing device 100 so that application 122 loads and begins running an application 116. In one example, the application is one which displays content that user 106 can interact with, consume, create, etc. Launching and running the application is indicated by block 160 in FIG. 2. The application can be, for instance, a word processing application 164, a spreadsheet application 166, a slide presentation application 168, or any of a wide variety of other applications 170.

At some point, mode identifier logic 132 identifies the particular mode in which user 106 is using the application. This is indicated by block 172. The mode may be, for instance, a mode in which user 106 is primarily consuming content, such as reading a document, presenting a slide presentation, etc. In another instance, the mode may be one in which user 106 is authoring or otherwise modifying content, such as authoring or revising a word processing document, generating a slide presentation, etc.

Mode identifier logic 132 can identify the mode in a wide variety of different ways. For instance, it can monitor the user inputs detected by user interface logic 110 to determine the mode that user 106 is in. If the user, for instance, is providing a high level of authoring inputs on a word processing document, the mode identifier logic 132 may identify the mode as an authoring mode, as opposed to a consumption mode. Identifying the mode based on user inputs is indicated by block 174.

The mode can be based on detected application settings as well. For instance, if a slide presentation application is set to presentation mode, this may be detected by mode identifier 132 as a consumption mode.

Mode identifier logic 132 can also identify the mode based on other inputs, such as inputs from sensors 124. For instance, where sensor 124 is an accelerometer that provides a sensor signal indicating that user 106 is walking, mode identifier logic 132 may interpret this as indicating that it is very unlikely that user 106 is in an authoring mode, but is instead in a consumption mode. This is only one example and a wide variety of other sensor inputs from sensors 124 can be used to identify the mode as well. Identifying the mode based on other sensor inputs is indicated by block 176 in the flow diagram of FIG. 2.

If logic 132 determines that user 106 is in a consumption mode then the contextual command bar is not displayed, in order to maximize display real estate for the content being consumed. However, if user 106 is in an authoring mode, then context identifier logic 134 detects user inputs that would trigger the contextual command bar to be surfaced. Determining whether the mode is a consumption mode or an authoring mode is indicated by block 178 in FIG. 2 and detecting user inputs indicating that the command bar is to be surfaced is indicated by block 180.

The user inputs that trigger surfacing of the contextual command bar can be a wide variety of different user inputs. For instance, in one example, if the user selects a content item on the user interface display, this may trigger surfacing of the contextual command bar. Detecting selection of a content item is indicated by block 182. However, a wide variety of other user inputs may be detected and interpreted as an indication that the contextual command bar is to be surfaced. This is indicated by block 184.

Context identifier logic 134 then identifies an application commanding context. This is indicated by block 186 in FIG. 2. The commanding context is a context in which the application is currently running, and it is indicative of which commands a user is most likely to invoke. For instance, if the user is in an authoring mode, with a word processing document, and the user has selected a word in the document, it may be that the user is most likely to invoke one of a first set of commands. However, if the user is in a word processing document and has selected a table, it may be that the user is most likely to invoke one of a second set of commands.

In order to identify the application commanding context, context identifier logic 134 may first identify the particular application, or the type of application that the user is running. This is indicated by block 188. By way of example, it may identify the application as a word processing application, a spreadsheet application, a slide presentation application, etc. Context identifier logic 134 may then identify the type of the selected content item. This is indicated by block 190. For instance, it may identify the content item as a word, a paragraph, a subtitle, a table, an image, a column in a spreadsheet application, and object on a slide, etc.

Context identifier logic 134 may also identify the context based on the user's current activity, or history of activity. This is indicated by block 192. For instance, if the user has historically performed a formatting command after the user selects a paragraph in a word processing document, then context identifier logic 134 may identify the context based on that history. In addition, if the user is currently authoring a document, and has performed editing inputs, such as selecting and moving text within the document, then context identifier logic 134 may identify the context based on that recent activity. These are examples only and context identifier logic 134 can identify the context that the application is in based on a wide variety of other items as well. This is indicated by block 194.

Once context identifier logic 134 has identified the particular context of the application, then command set identifier logic 136 identifies a set of commands that user 106 is most likely to invoke, given that context. This is the set of commands that will be surfaced on the contextual command bar. Identifying the set of commands to be surfaced is indicated by block 196 in FIG. 2. Command identifier logic 136 can access pre-computed context-to-command mappings 118, based on the identified context. Mappings 118 illustratively map from an identified context to a set of commands that are to be displayed on the contextual command bar. Identifying the set of commands to be surfaced based on the context-to-command mappings 118 is indicated by block 198 in FIG. 2.

Figure 3A:
FIGS. 3A-3C show examples of contexts and corresponding commands that can be generated in a word processing application, a slide presentation application, and a spreadsheet application, respectively.
Figure 3B:
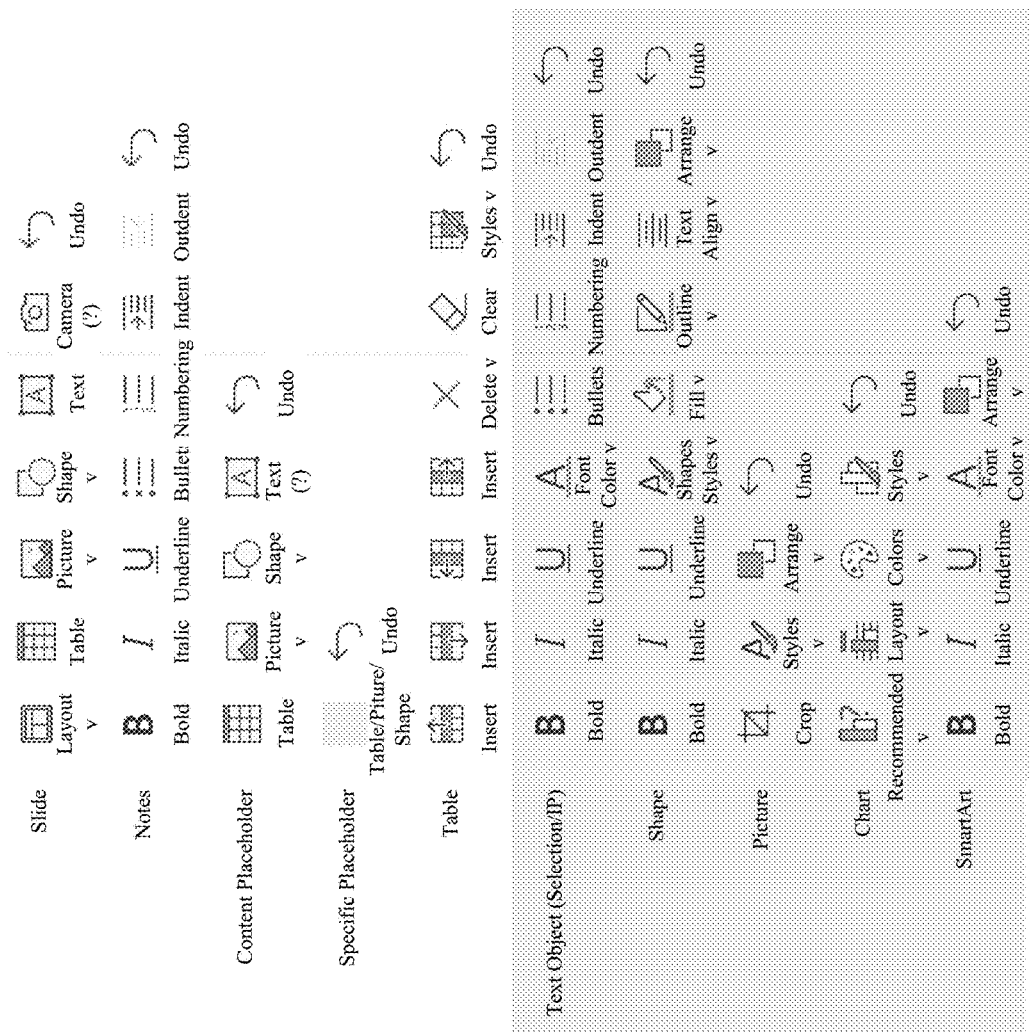
Figure 3C:
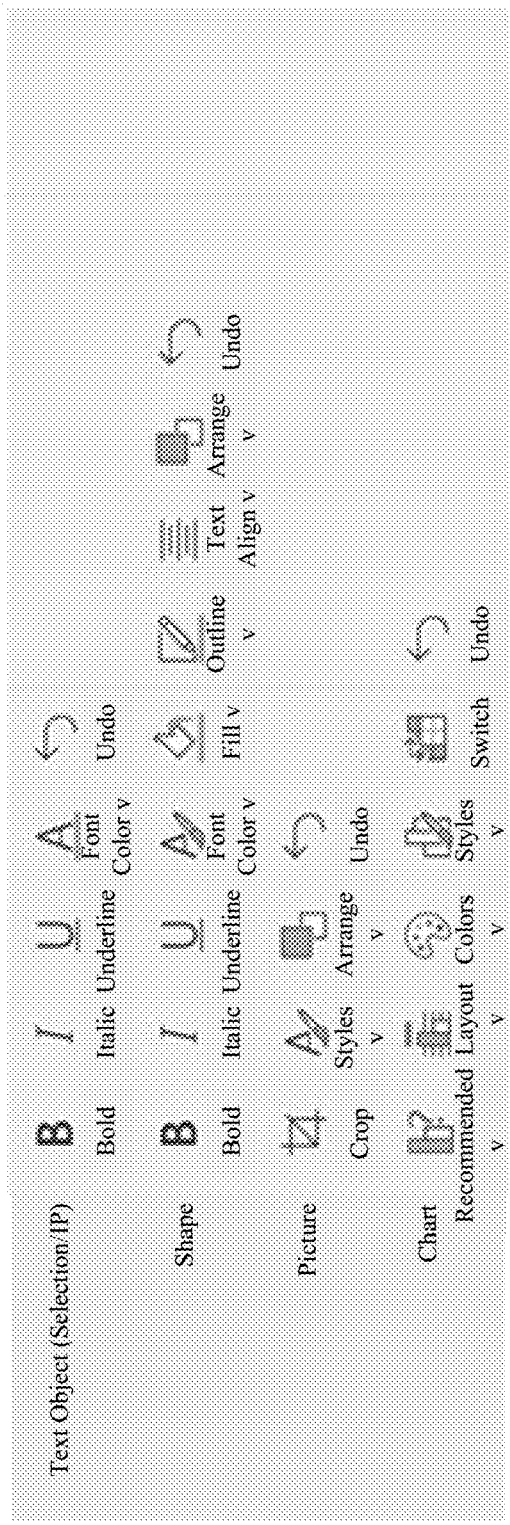

FIGS. 3A-3C show one example of context-to-command mappings 118. FIG. 3A shows mappings 118 for a word processing application. The left most column in FIG. 3A indicates a particular display item that is selected in a word processing document, and indicates the context of the word processing document. Following that, to the right of each identified context, is a set of display elements (or visual command identifiers) that correspond to the identified set of commands to be surfaced on the corresponding contextual command bar. By way of example, in FIG. 3A, if an item of text is selected, this corresponds to a "text" context. Therefore, the set of commands that will be identified on the contextual command bar include the "bold" command, the "italics" command, the "underline" command, the "highlight" command, the "font color" command, the "bullets" command, the "numbering" command, the "indent" command, etc. The final command is illustratively the "undo" command.

If a table is selected in the word processing document, then this corresponds to the "table" context. The set of commands that will be surfaced on the contextual command bar, when in the "table" context, include the "insert" commands, the "delete" command, the "clear" command, the "styles" command, and the "undo" command.

The Example in FIG. 3A also shows the set of commands that will be surfaced on the contextual command bar when a text object is selected, when a shape is selected, and when a picture is selected. It will be noted that these are example contexts only, and the corresponding set of commands surfaced for those contexts are example sets as well. Other contexts can be identified in a word processing application, and the contextual commands associated with each context can vary as well. Those illustrated in FIG. 3A are illustrated for the purpose of example only.

FIG. 3B shows the contexts and corresponding sets of contextual commands that are surfaced on the contextual command bar, when in a slide presentation application. Thus, the contexts correspond to user selection of a "slide", "notes", a "content placeholder", a "specific placeholder", a "table", a "text object", a "shape", a "picture", a "chart", or "smart art".

FIG. 3C shows an example set of contexts and corresponding contextual commands that will be surfaced on the contextual command bar, when in a spreadsheet application. The contexts identify a particular item that has been selected by the user, and the commands to the right of each context are the display elements (or visual command identifiers) and corresponding commands that will be displayed when on the contextual command bar, for each context. Thus, the contexts correspond to user selection of a "text object", a "shape", a "picture" and a "chart". Again, these are only examples of different contexts that can be identified in a spreadsheet application, and they are also only examples of the contextual commands that will be surfaced, when in each of those contexts.

In another example, command set identifier logic 136 can compute the set commands to be surfaced dynamically instead of, or in addition to, using mappings 118. This may be based on the user's activity, or other current or changing information that tends to identify the likely commands that are to be invoked by the user. Computing the commands dynamically is indicated by block 200.

Logic 136 can identify the set of commands, based upon the identified context, in other ways as well. This is indicated by block 202.

Command bar generator logic 140 then generates a representation of the contextual command bar and provides it to user interface logic 110, which surfaces visual command identifiers for the identified set of commands on the contextual command bar, for user interaction. This is indicated by block 204 in FIG. 2. In one example, the visual command identifiers are arranged in order of their relevance. The relevance may be determined, for instance, based upon the likelihood that a given command is to be invoked by user 106 in the identified context. Thus, those that are most likely to be invoked are considered to be most relevant to the context, and the command identifiers for the most relevant commands are displayed first on the contextual command bar. Arranging the visual command identifiers on the contextual command bar, in order of relevance, is indicated by block 206.

The contextual command bar can take a wide variety of different forms. In one example, it is a horizontally scrollable display that includes a visual command identifier corresponding to each of the commands in the identified set of commands Displaying the command bar as a horizontally scrollable display is indicated by block 208.

Also, in one example, the contextual command bar has a set of visual command identifiers that correspond to fixed commands By fixed, it is meant that the visual command identifiers for those commands are displayed, regardless of the particular context identified. In one example, the set of fixed commands includes a link to the entire commanding palette, and it can include other fixed commands as well. Displaying the contextual command bar with fixed commands is indicated by block 210 in FIG. 2. The identified set of commands can be surfaced on the contextual command bar in other ways as well, and this is indicated by block 212.

Figure 3D:
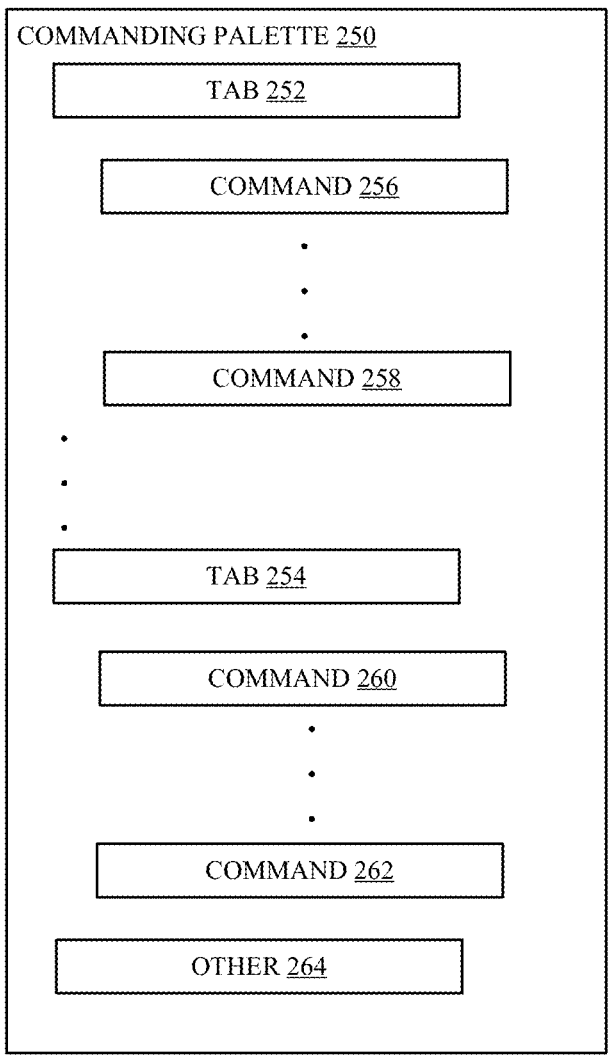
FIG. 3D is a block diagram schematically illustrating one example of a commanding palette.

In one example, the set of commands to be surfaced are drawn from the commanding palette, for the running application. FIG. 3D is a block diagram that schematically illustrates one example of a commanding palette 250. In the example shown in FIG. 3D, commanding palette 250 is hierarchically arranged with a set of tabs 252-254. Each tab has a corresponding set of commands 256-258, and 260-262. It can also include other items 264. Therefore, assume that the user actuates a tab (such as tab 252) on the commanding palette 250. In that case, display elements (or visual command identifiers) corresponding to each of the commands 256-258 hierarchically arranged under the actuated tab 252 are displayed on the commanding palette display.

The identified set of commands to be surfaced on the contextual command bar can, in one example, be the most likely commands from the commanding palette 250, but they need not be confined to commands under a single tab. For instance, if one tab 252 corresponds to formatting commands, and another tab 254 corresponds to inserting comments or links in the document, the identified set of commands to be surfaced on the contextual command bar, in a given context, may be commands that would be arranged under two or more different tabs 252-254 in commanding palette 250. They need not all come from the set of commands under a single tab. Instead, they may simply be the most relevant commands taken from the entire commanding palette.

Figure 4:
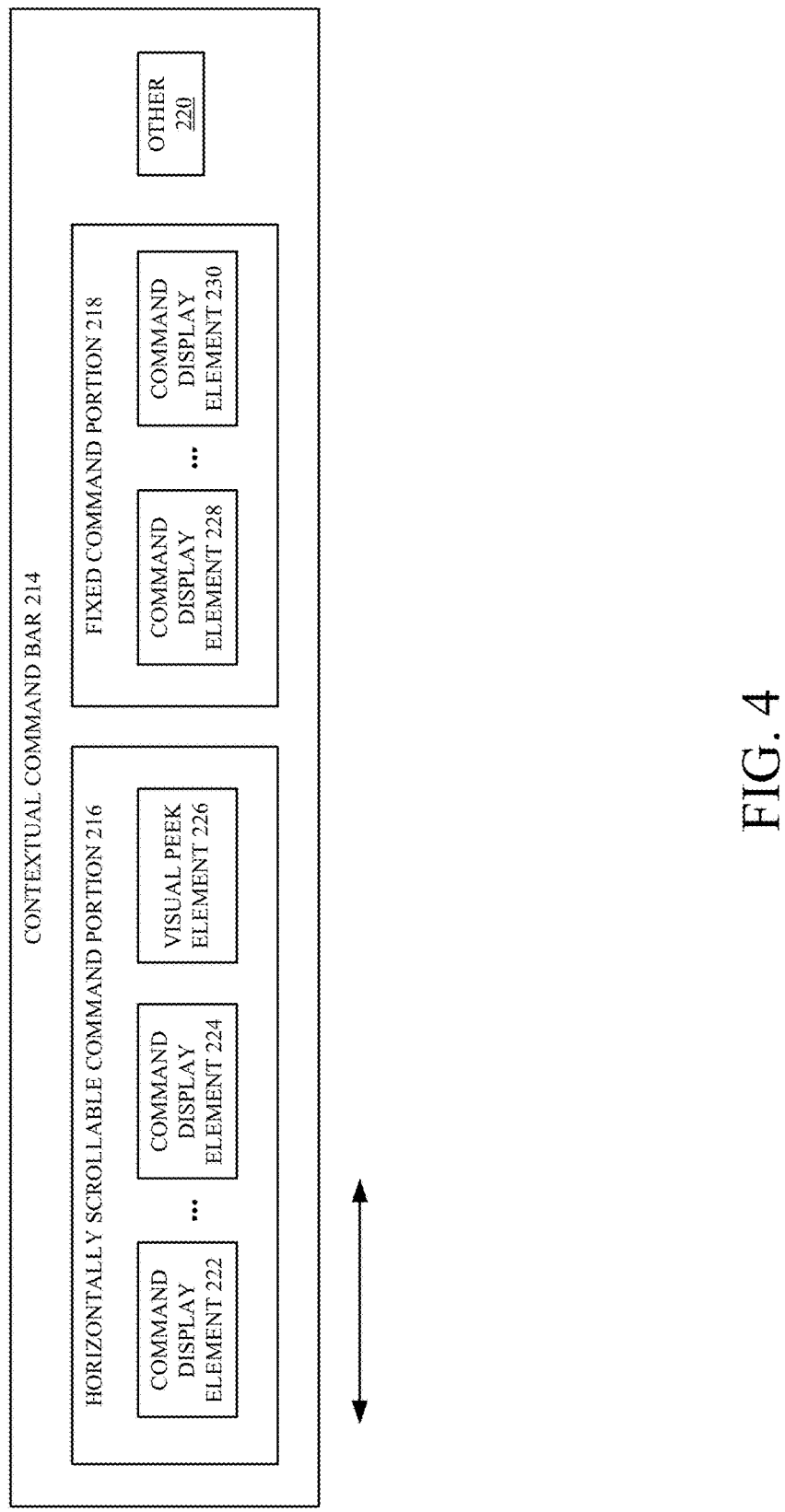
FIG. 4 is a block diagram schematically illustrating one example of a contextual command bar.

FIG. 4 is a block diagram that schematically illustrates one example of a contextual command bar 214. It can be seen that command bar 214 includes a horizontally scrollable command portion 216 and a fixed command portion 218. It can of course include other items 220 as well. The horizontally scrollable command portion 216 includes a plurality of command display elements (or visual command identifiers) 222-224 and a visual peek display element 226. Each of the command display elements 222-224 is illustratively a user actuatable display element that, when actuated by user 106, invokes a corresponding command represented by the actuated command display element.

For example, and referring also to FIG. 3A, assume that the user is in a word processing document and has selected an item of text in that document. Then, the context for contextual command bar 214 will be the "text" context shown in FIG. 3A. Each of the command display elements 222-224 will correspond to one of the visual command identifiers associated with the "text" context in FIG. 3A. For instance, command display element 222 may correspond to the "bold" command. Therefore, when the user actuates command display element 222, the "bold" command will be invoked so that the selected text is bolded. This is just one example.

The visual peek element 226 is illustratively a visual display element that gives a visual cue that there are more contextual commands to the right of display element 226, so that when the user scrolls the horizontally scrollable command portion 216 to the left, the command display elements corresponding to those commands will be visually displayed in the horizontally scrollable command portion 216.

FIG. 4 also shows that fixed command portion 218 illustratively includes one or more command display elements (or visual command identifiers) 228-230. Each command display element 228-230 corresponds to a command that can be invoked by the user, when the user actuates the command display element 228-230. The fixed command portion 218 illustratively displays command display elements 228-230 for a fixed set of commands, that do not vary with command display elements displayed in the horizontally scrollable command portion 216. In one example, as discussed above with respect to FIG. 2, the command display elements 228-230 in the fixed command portion always correspond to a link to the entire commanding palette from which the contextual commands are obtained, and they can include an "undo" command as well. These are only examples of fixed command display elements displayed in the fixed command portion 218.

Figure 5A:
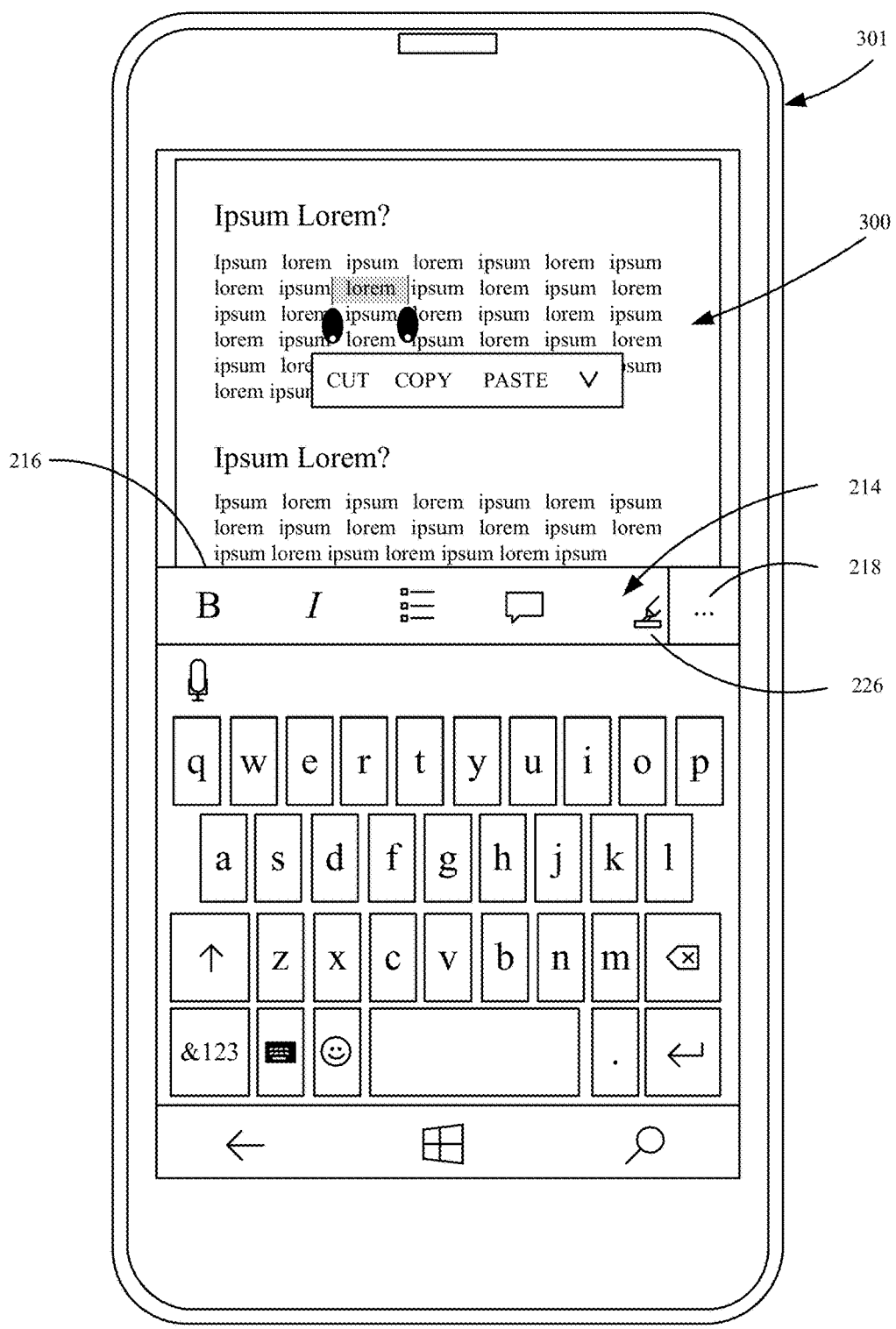
FIGS. 5A-5H show examples of user interface displays.

FIGS. 5A-5H show various examples of contextual command bars, in different scenarios. FIG. 5A shows one example in which user 104 is authoring a text document displayed in display portion 300 of a mobile device 301. It can be seen that the user has selected a textual word in display portion 300. This indicates to context identifier logic 134 that the contextual command bar should be displayed. Therefore, logic 134 identifies the set of contextual commands to be displayed on the contextual command bar and displays contextual command bar 302. Command bar 302 is shown with the horizontally scrollable command portion 216 and the fixed command portion 218. It can be seen that each visual command identifier on contextual command bar 302 corresponds to a command that can be invoked by user 106 when user 106 actuates the corresponding visual command identifier. Contextual command bar 302 also includes the peek display element 226. In the example shown in FIG. 5A, the peek element shows part of a visual command identifier corresponding to a command. Peek display element 226 provides a visual cue to the user that the horizontally scrollable display portion 216 can be scrolled to the left, so that more visual command identifiers, corresponding to more contextual commands, will scroll out from underneath the fixed command portion 218, which does not move when portion 216 is scrolled.

In the example shown in FIG. 5A, the fixed command portion 218 has one visual command identifier. The single visual command identifier, when actuated by the user, serves as an entry point to the overall commanding palette 250. Therefore, when it is actuated, commanding palette 250 for the running application is displayed with the most relevant tab selected.

Figure 5B:
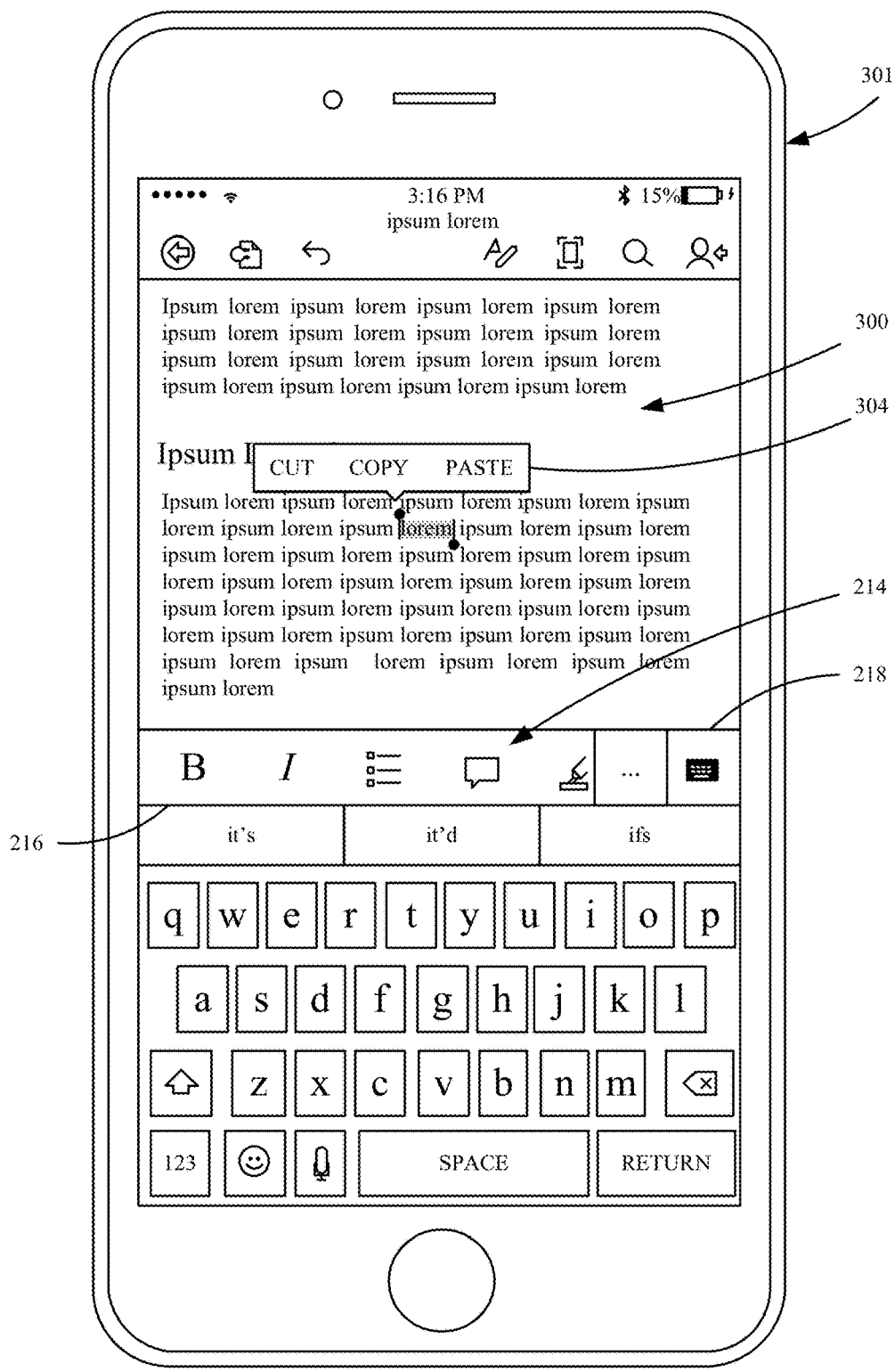

FIG. 5B is similar to FIG. 5A and similar items are similarly numbered. However, in the example shown in FIG. 5B, the "cut, copy, paste" commands are displayed in a separate display section 304, adjacent the highlighted text. Also, the fixed command portion 218 has two command display elements. One is similar to that shown in FIG. 5A and serves as an entry point to the overall commanding palette 250. The other is a display element that, when actuated by the user, dismisses the keyboard so that the keyboard is no longer displayed on the user interface display.

Figure 5C:
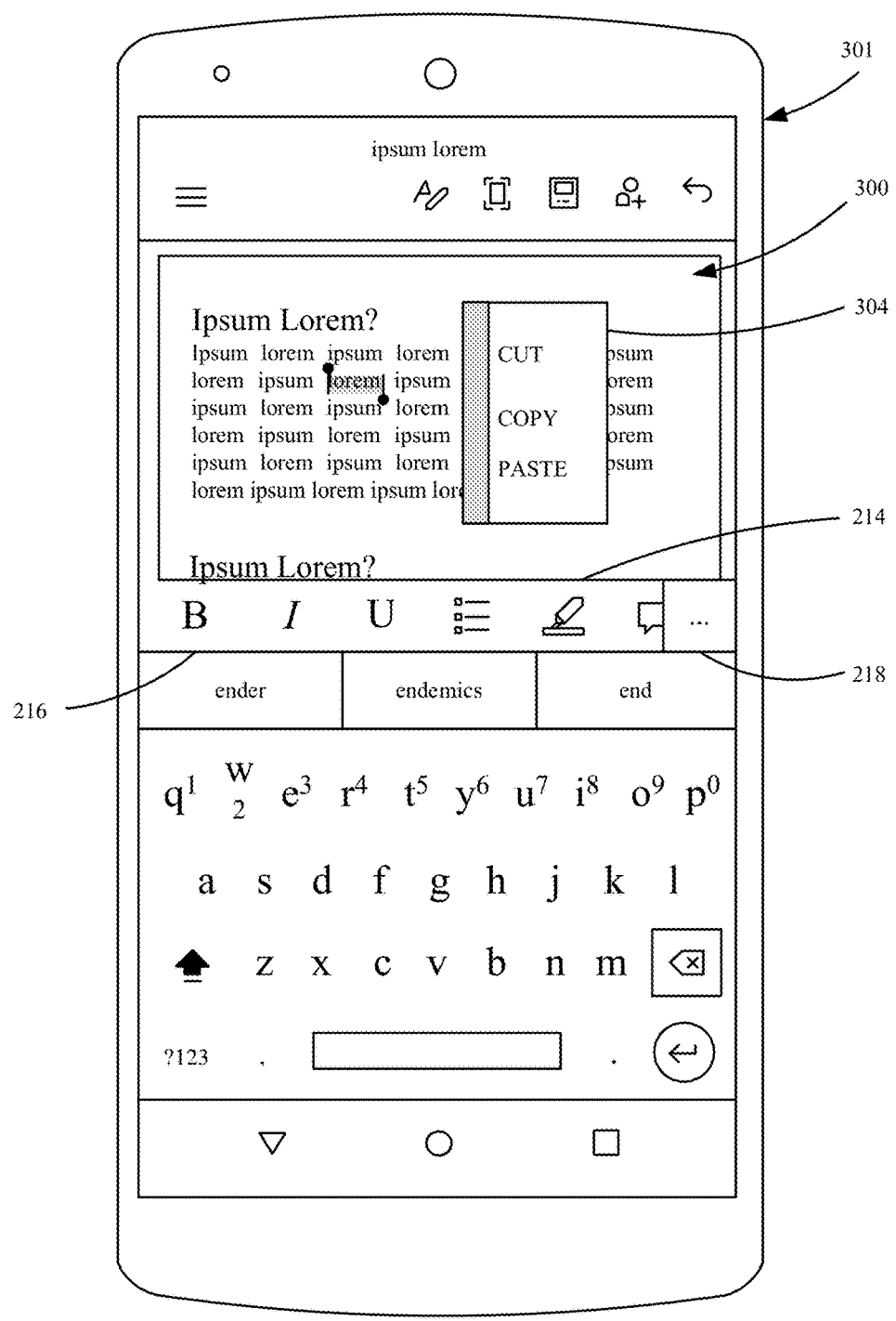

FIG. 5C is similar to that shown in FIG. 5B, and similar items are similarly numbered. However, in FIG. 5C, the "cut, copy, paste" commands are displayed in a slightly different display element 304, from that shown in FIG. 5B.

Figure 5D:
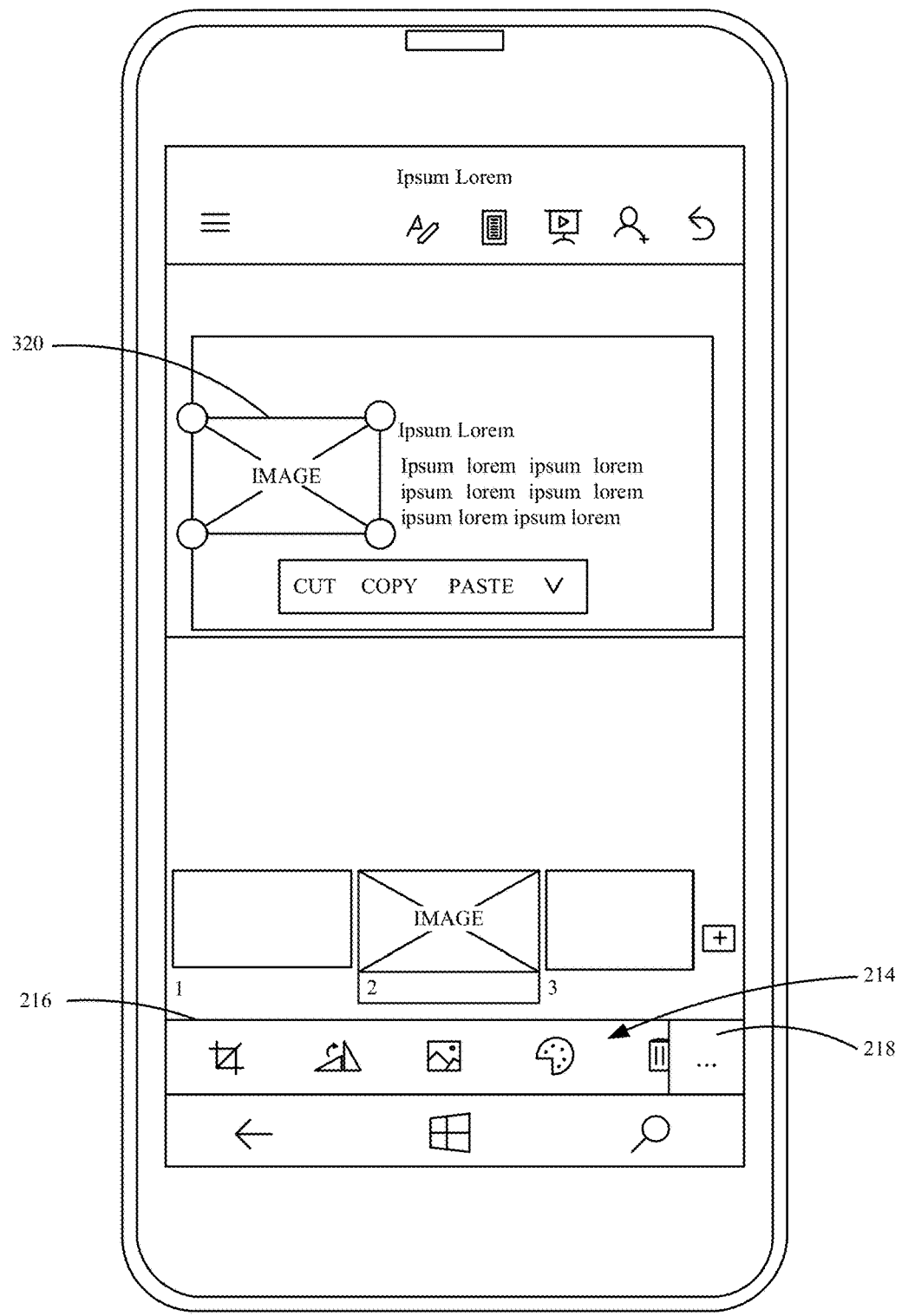
Figure 5E:
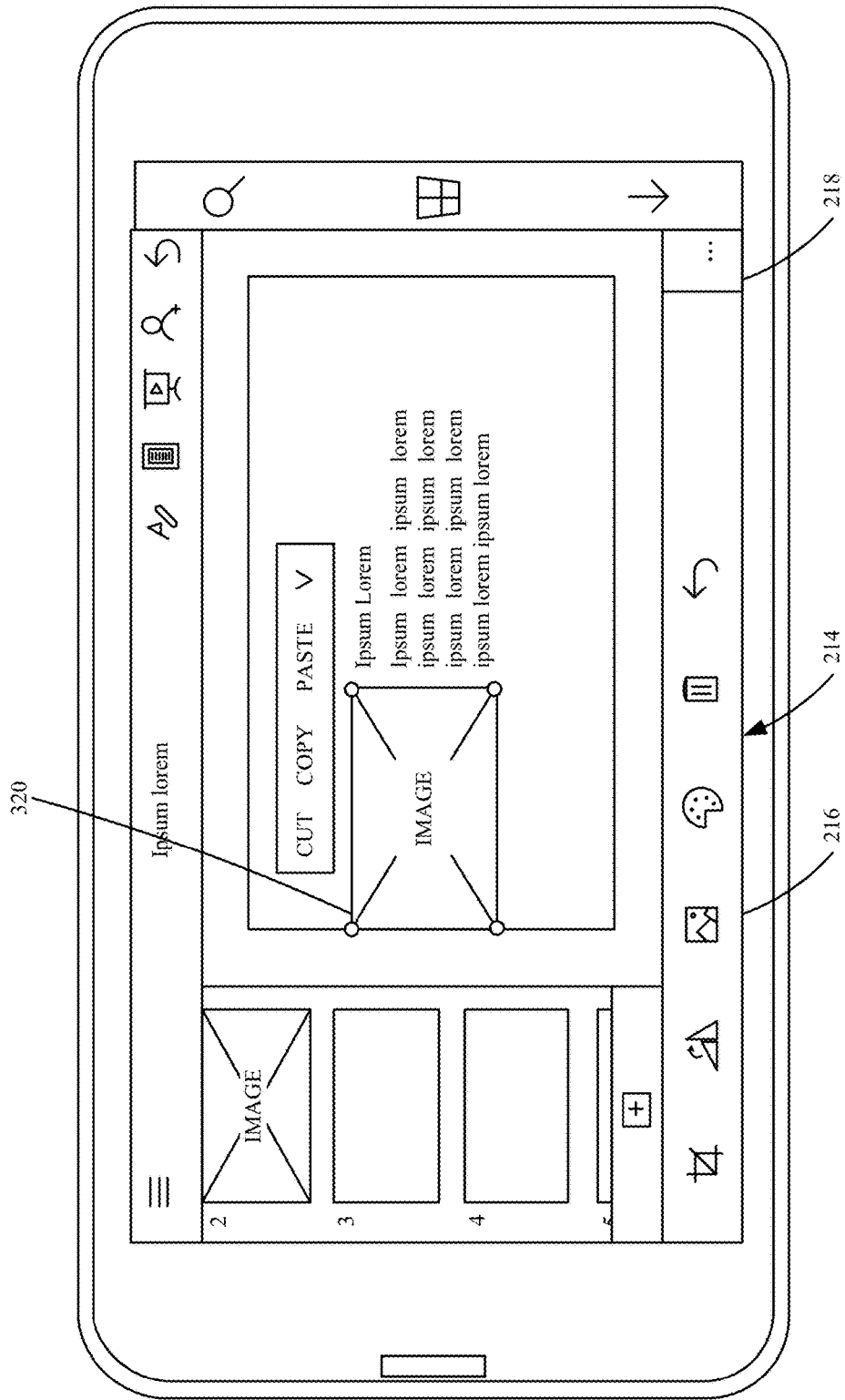

FIGS. 5D and 5E show how the contextual command bar 214 can be displayed in different ways, based upon the orientation of the device displaying it. It can be seen that contextual command bar 214 has horizontally scrollable command portion 216 and fixed command portion 218, as in the previous figures. FIG. 5D shows a smart phone in which the user has selected or highlighted an image 320. Thus, the contextual command bar 214 is displayed, and shows visual command identifiers for commands corresponding to a context in which an image has been selected.

FIG. 5E, on the other hand, shows that the mobile device of FIG. 5D is now rotated so that the display is in landscape mode. Because the display is in landscape mode, there is sufficient display real estate to show all visual command identifiers in the contextual command bar 214, without the need to hide any so that the user can see all visual command identifiers without scrolling the contextual command bar 214. In such an example, user interface logic 110 (shown in FIG. 1) detects rotation of the mobile device (such as by receiving a signal from an orientation sensor) and switches the user interface display to landscape mode. It thus displays the contextual command bar provided by system 128 in the way illustrated in FIG. 5E.

Referring again to the flow diagram of FIG. 2, once the contextual command bar is surfaced for user interaction, then the user can interact with the contextual command bar in a variety of different ways. Interaction processing logic 138 illustratively detects user interaction with the contextual command bar. This is indicated by block 270 in FIG. 2. User interaction processing logic 138 then performs any desired actions, based upon the detected user interaction. This is indicated by block 274. This can take a wide variety of different forms as well.

For example, when the user interacts with the contextual command bar by providing a horizontal scroll input to scroll the contextual command bar, then interaction processing logic 138 controls user interface logic 110 to scroll the command bar accordingly. This is indicated by block 276.

It may also be that the user actuates one of the visual command identifiers on the contextual command bar. For instance, it may be that the user actuates one of the visual command identifiers in the fixed command portion 218 (shown in FIG. 4) of the contextual command bar that links to the commanding palette. In that case, interface processing logic 138 identifies a most relevant tab in the commanding palette (based on the detected context) and controls user interface logic 110 to display the commanding palette, with the most relevant tab selected. This is indicated by block 278. As an example, it may be that certain contexts have corresponding contextual commands that are arranged under different tabs in the commanding palette. However, it may also be that the detected context is most highly related to one of the tabs in the commanding palette. Thus, when the user actuates the link to the commanding palette on the fixed command portion of the contextual command bar, the commanding palette will be displayed with the most relevant tab highlighted.

The visual command identifiers 222-224 in the horizontally scrollable command portion 216 may also correspond to commands that perform direct action, in response to the user actuating the corresponding visual command identifier. By way of example, where the commands are formatting commands, such as "bold", "italics", "underline", etc., the selected text may be directly bolded, italicized, underlined, etc. in response to the user actuating the corresponding visual command identifier. Performing such a direct action based on the user actuation is indicated by block 280 in FIG. 2.

Figure 5F:
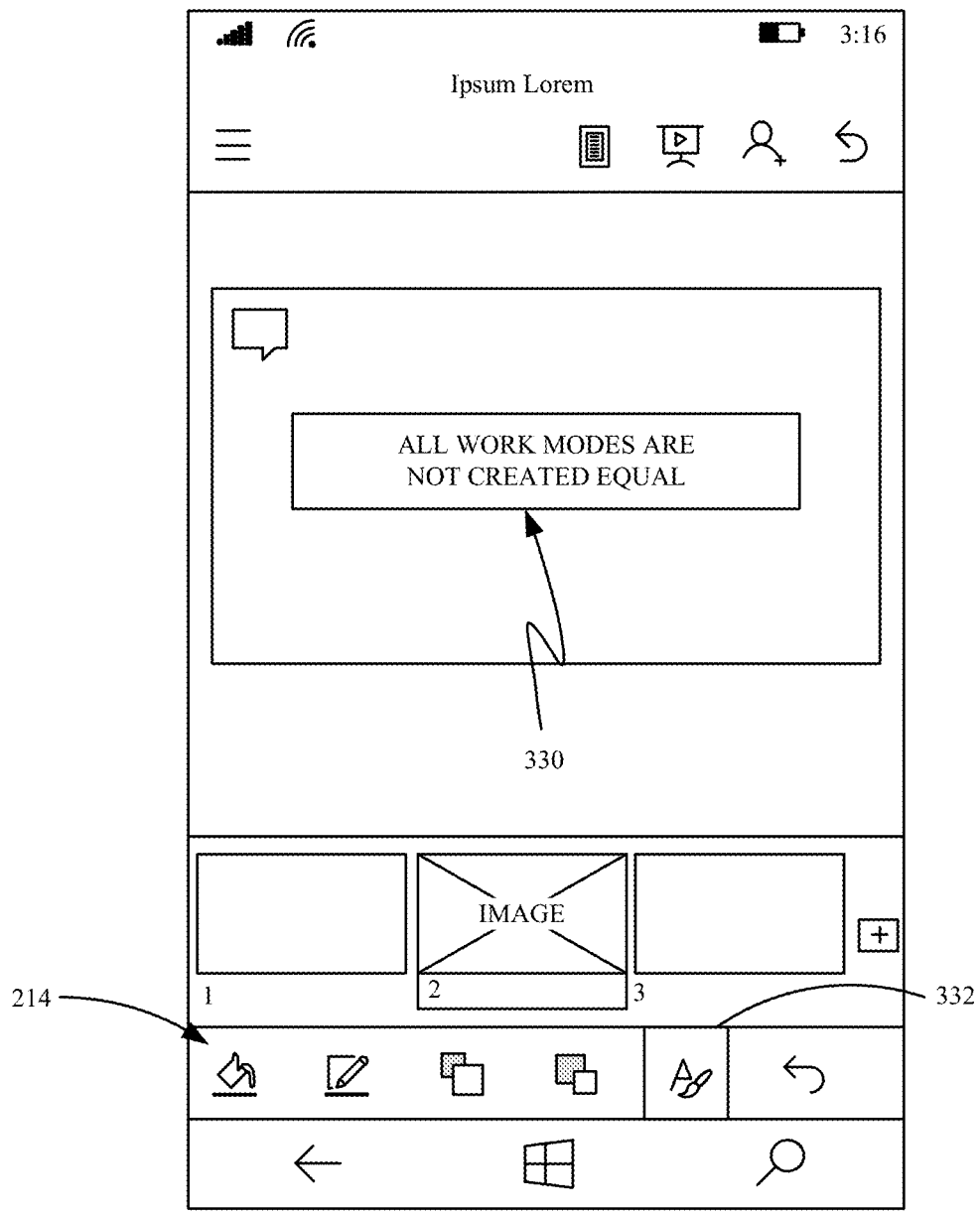
Figure 5G:
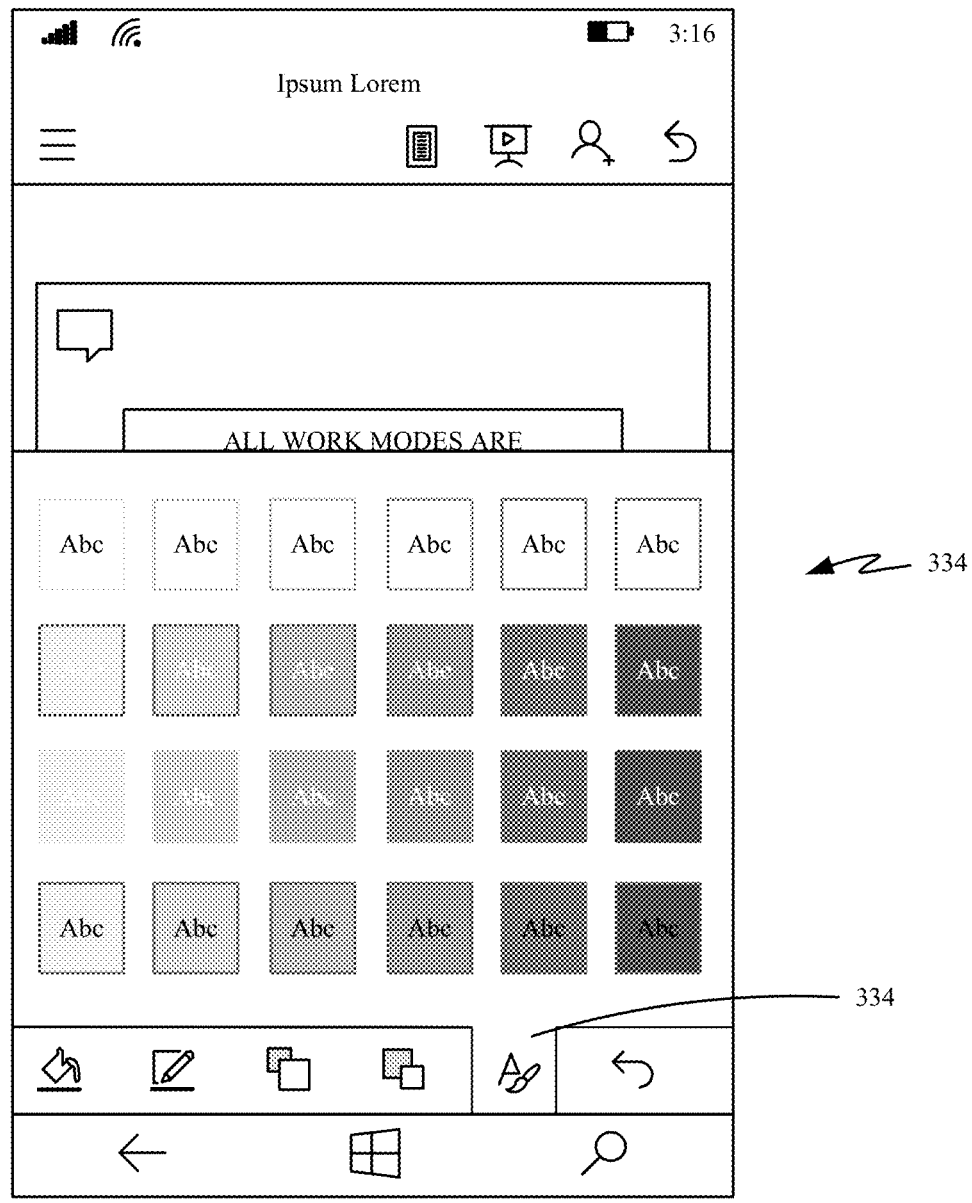
Figure 5H:
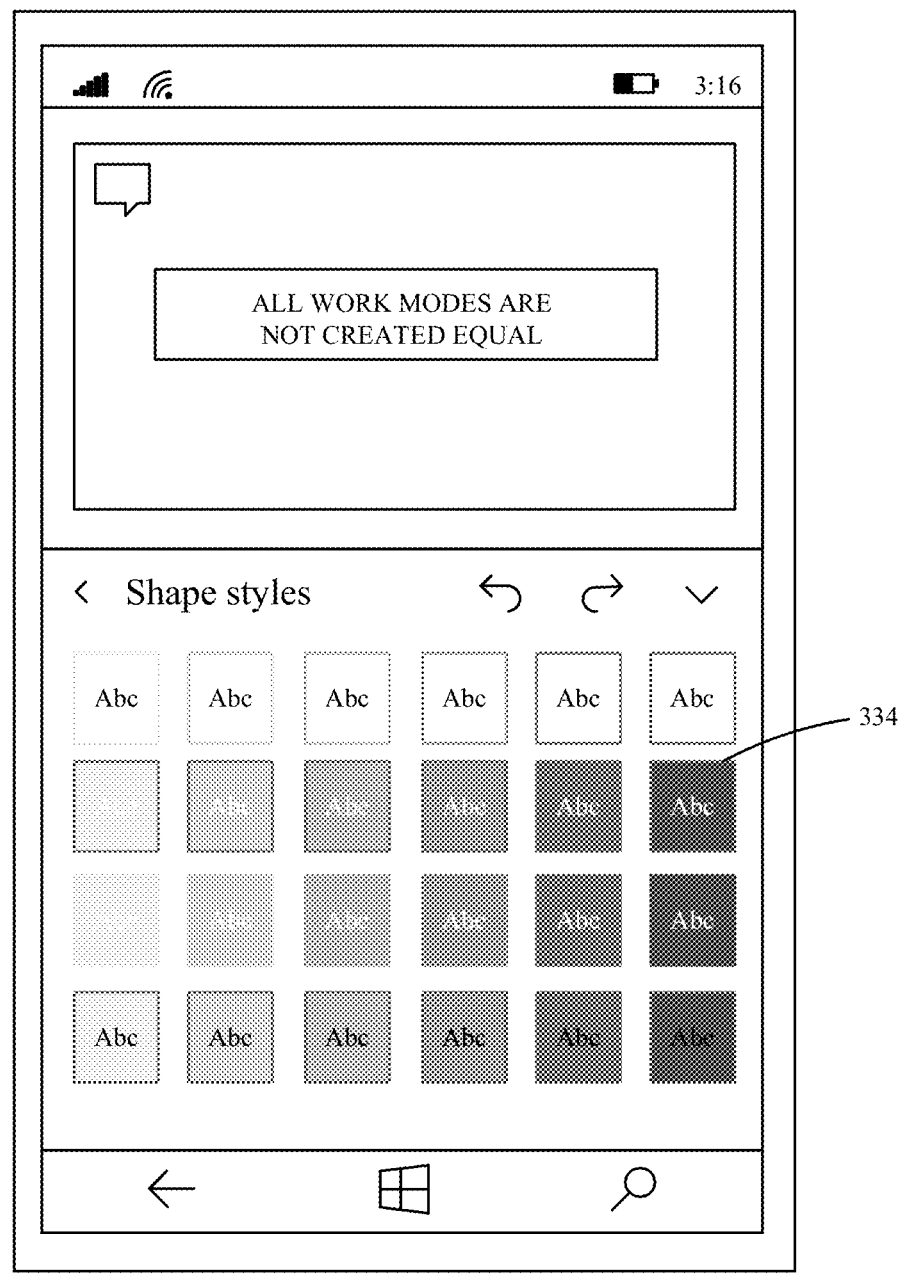

In another example, the command display elements may be entry points into a gallery or flyout menu or other similar display interface. In that case, in response to user actuation of the corresponding visual command identifier, interaction processing logic 138 will control user interface logic 110 to display the corresponding gallery or flyout menu. This is indicated by block 282. FIGS. 5F-5H show examples of this.

It can be seen in FIG. 5F that the user has selected text shown generally at 330 on the user interface display of the mobile device. The selected text is on a slide in a slide presentation document displayed by a slide presentation application running on the mobile device. Thus, the contextual command bar 214 shows visual command identifiers corresponding to commands that can be performed on the selected text. FIG. 5G shows that the user has actuated visual command identifier 332 that corresponds to the command which allows the user to change the text color of the highlighted text. In response, interaction processing logic 138 controls user interface logic 110 to display the gallery 334 of different colors that the user can select from in order to perform the command In the example shown in FIG. 5G, the visual command identifier 332 corresponding to changing text color is displayed, along with the remainder of contextual command bar 214, even when gallery 334 is displayed. FIG. 5H, on the other hand, shows another example. FIG. 5H is similar to FIG. 5G, and similar items are similarly numbered. In FIG. 5G, however, once the user has selected the command display element 332, then the contextual command bar disappears, and only the gallery 334 is displayed. Of course, these are only examples.

Referring again to the flow diagram in FIG. 2, it may be also that the command associated with one or more of the visual command identifiers on the contextual command bar invokes an external experience, when it is actuated by the user. For instance, the command display element may represent a hyperlink or a comment. Therefore, when the user actuates the command display element, the hyperlink is navigated, or a comment user experience is generated by which the user can enter, view, or otherwise interact with a comment. Invoking an external experience based on user actuation of a visual command identifier in the contextual command bar is indicated by block 284 in FIG. 2B.

It will be noted that the interactions described above are examples only. Interaction processing logic 138 can perform actions or commands based on user interactions in other ways as well, and this is indicated by block 286.

It can thus be seen that the present system greatly enhances the operation of the mobile device, itself. It extracts contextual command display elements, based upon a context of an application, and surfaces those for the user. The commands represented by those elements are a subset of the commands on the commanding palette for the application, and can be drawn from different tabs of the commanding palette. They are the commands that are most relevant to the detected context, in that they are those most likely to be invoked by the user. This saves significant processing overhead on the mobile device itself. Instead of having to generate various display screens in response to the user dismissing the keyboard, invoking the commanding palette, and navigating through different levels of the commanding palette to find a desired command, a contextual command bar with the most relevant commands is displayed and the commands can be directly invoked by the user from that command bar. This not only saves processing overhead in rendering displays and navigation needed to perform commands, but it also greatly enhances the user experience and efficiency.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
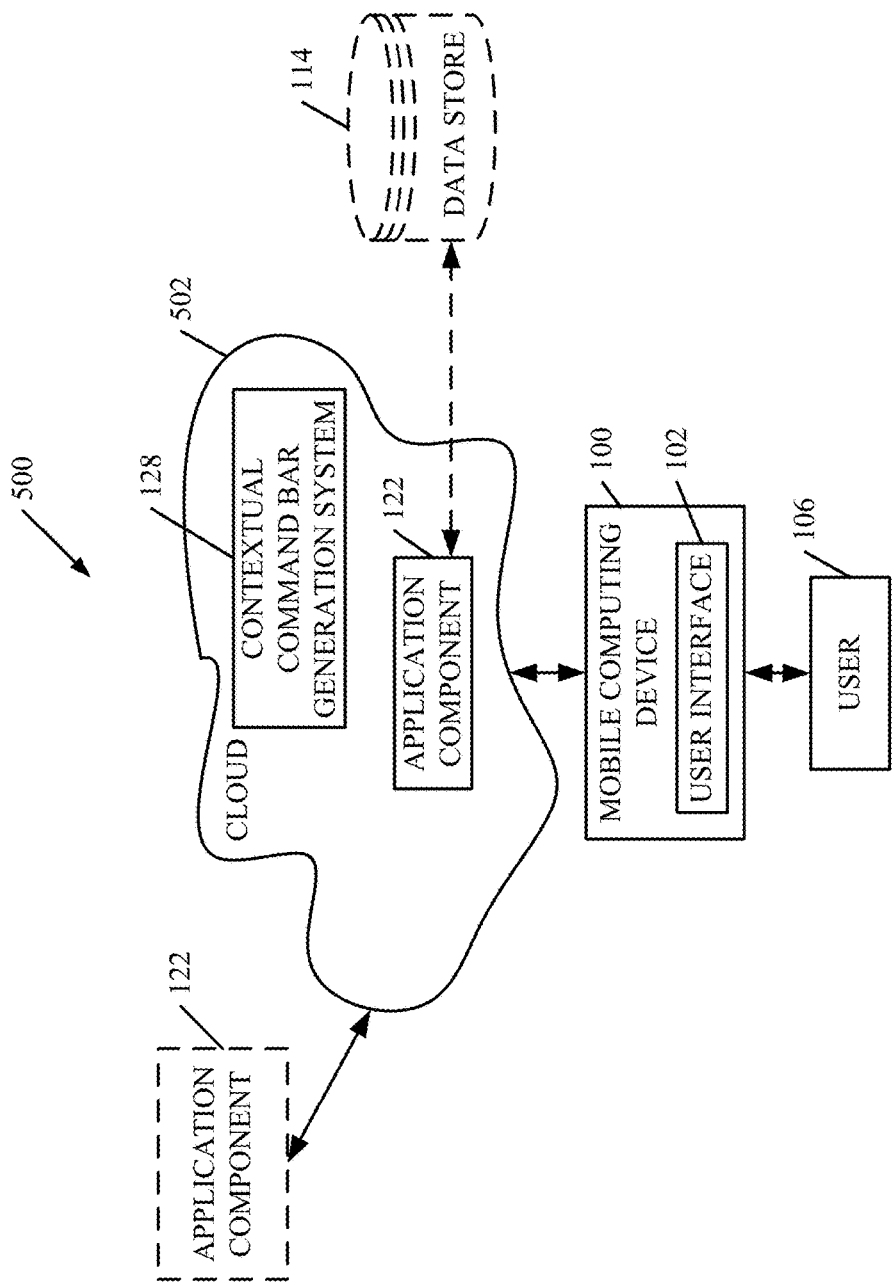
FIG. 6 is a block diagram of one example of a mobile device with components deployed in a cloud computing environment.

FIG. 6 is a block diagram of mobile computing device 100, shown in FIG. 1, except that some elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of device 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that mobile device 100 can communicate with an application component 122 that runs the application in the cloud and transmits pages for display on device 100. In such a scenario, contextual command bar generation system 128 can also be disposed in the cloud (which can be public, private, or a combination where portions are public while others are private). Therefore, user 106 uses mobile device 100 to access those systems through cloud 502.

FIG. 6 also depicts another example of a cloud architecture. FIG. 6 shows that it is also contemplated that some elements of mobile device 100 (shown in FIG. 1) can also be disposed in cloud 502 while others are not. By way of example, data store 114 can be disposed outside of cloud 502, and accessed through cloud 502. In another example, application component 122 can also be outside of cloud 502. Regardless of where they are located, they can be accessed directly by device 100, through a network (either a wide area network or a local area network), they can be hosted at a remote site by a service, or they can be provided as a service through a cloud or accessed by a connection service that resides in the cloud. All of these architectures are contemplated herein.

It will also be noted that items shown in device 100 in FIG. 1, can instead be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
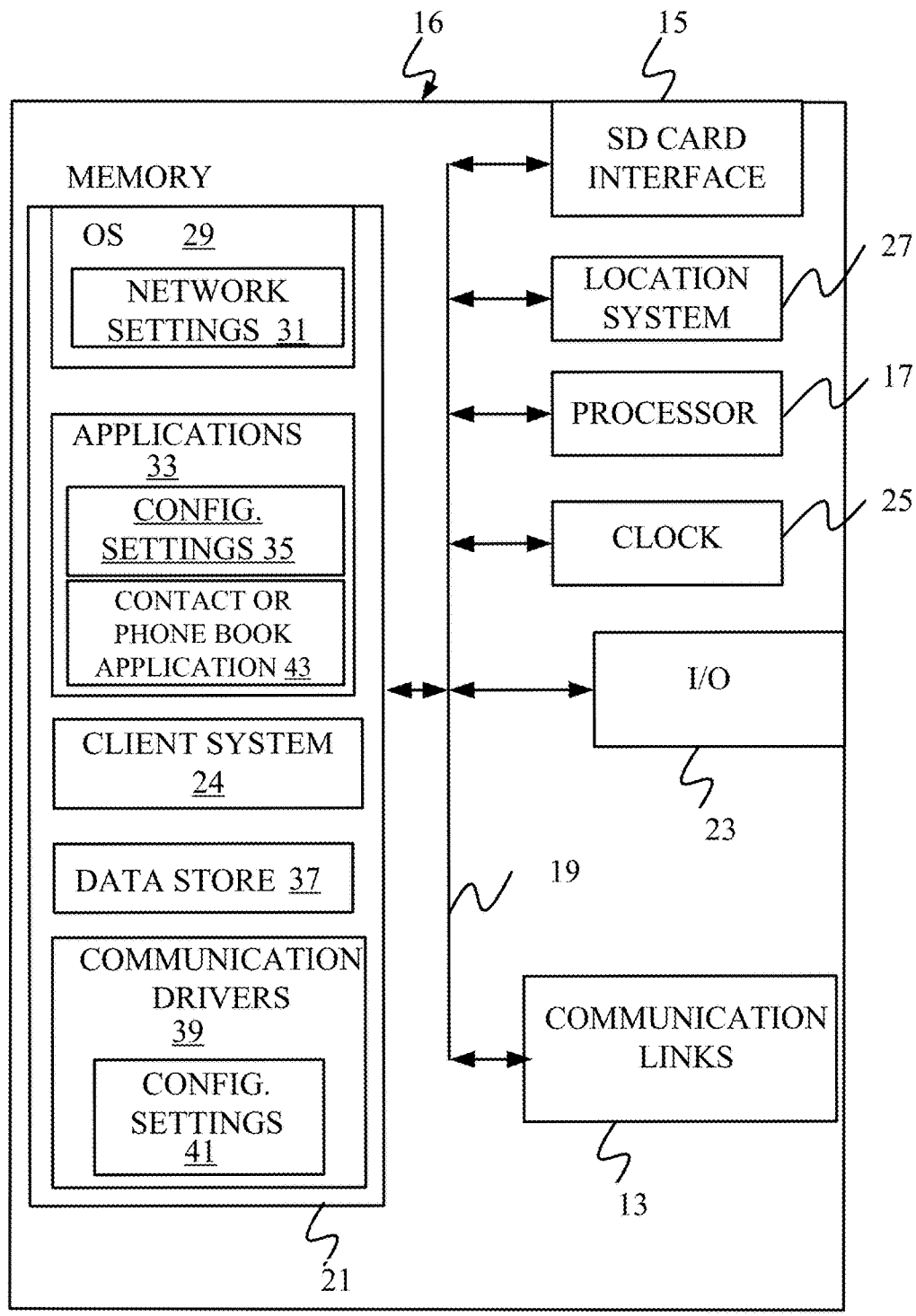
FIGS. 7-9 show various examples of mobile devices.
Figure 8:
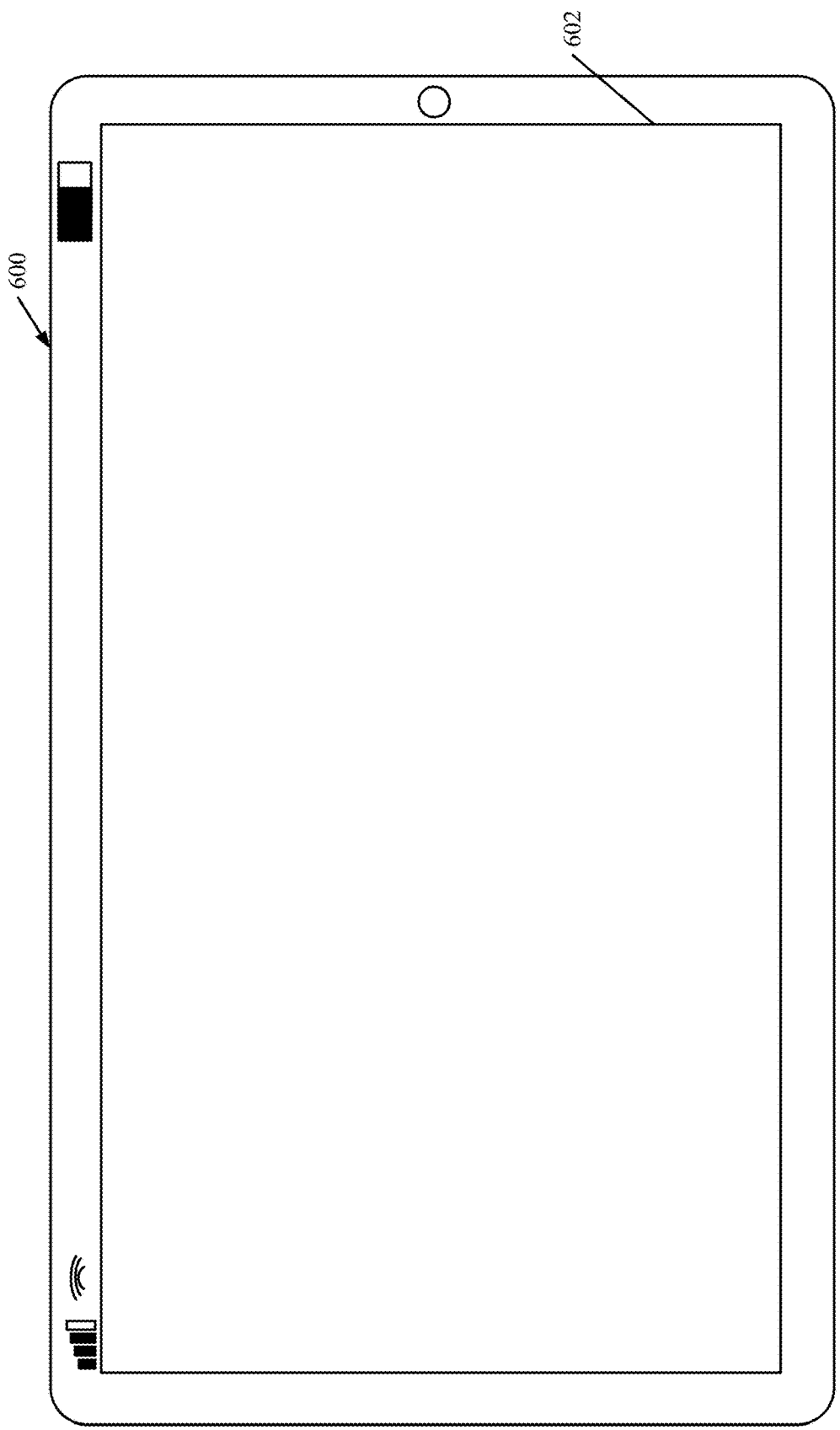
Figure 9:
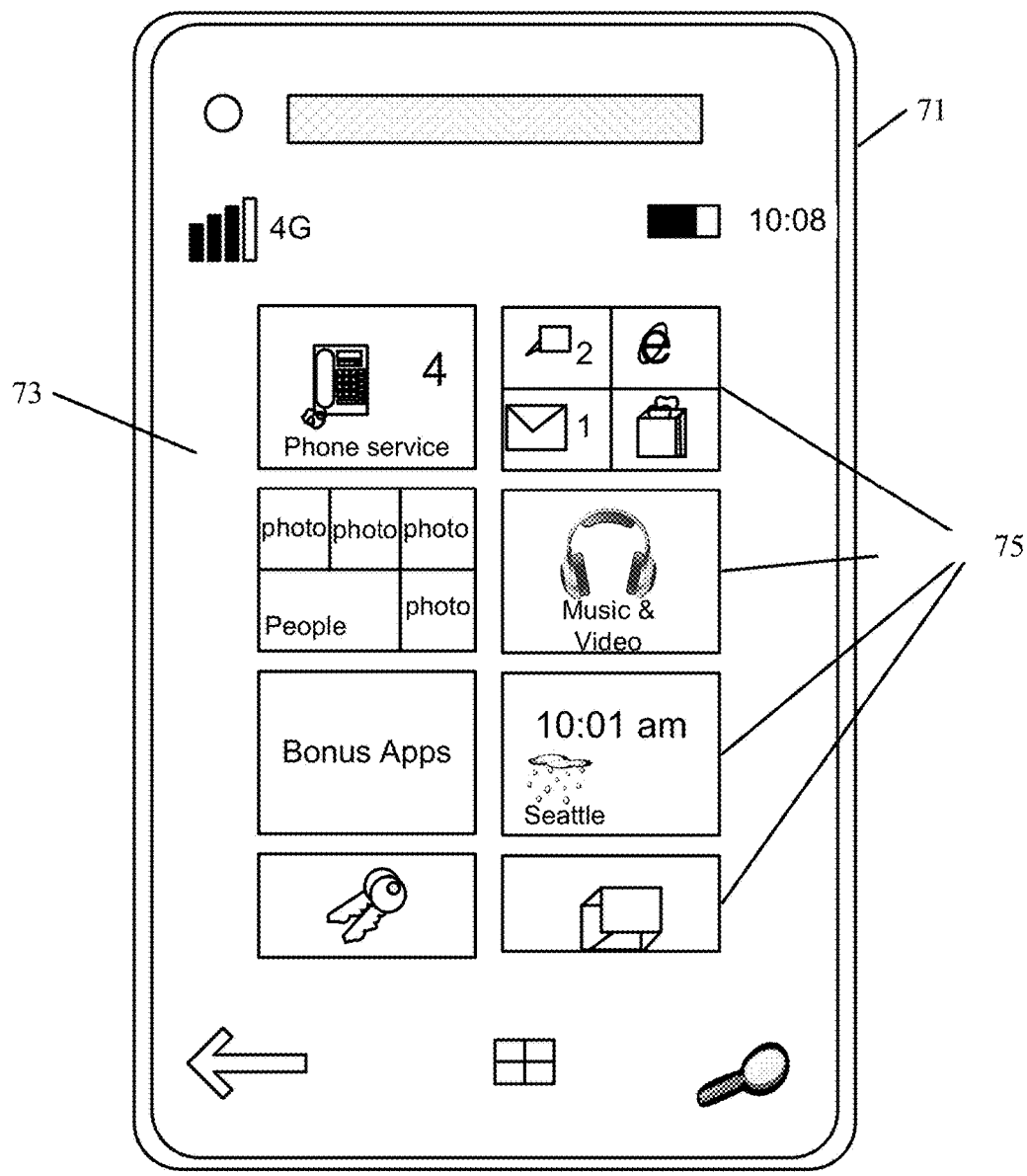

FIG. 7 is a simplified block diagram of one illustrative example of a handheld or mobile computing device 16 that can be used as a user's or client's hand held device 100 in the previous Figures. FIGS. 8-9 are examples of handheld or mobile devices.

FIG. 7 provides a general block diagram of some the components of a client device 16 in addition to those shown in FIG. 1. In the device 16, a communications link 13 is provided and can be part of communication systems 126 shown in FIG. 1. Link 13 allows the handheld device to communicate with other computing devices and under some examples provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors 108 from FIG. 1) along a bus 19 that is also connected to memory 21 and input/output (I/O) components 23, as well as clock 25 and location system 27.

I/O components 23, in one example, can be part of user interface mechanism 112 (in FIG. 1) and can be provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 (which can be one of sensors 124 in FIG. 1) illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
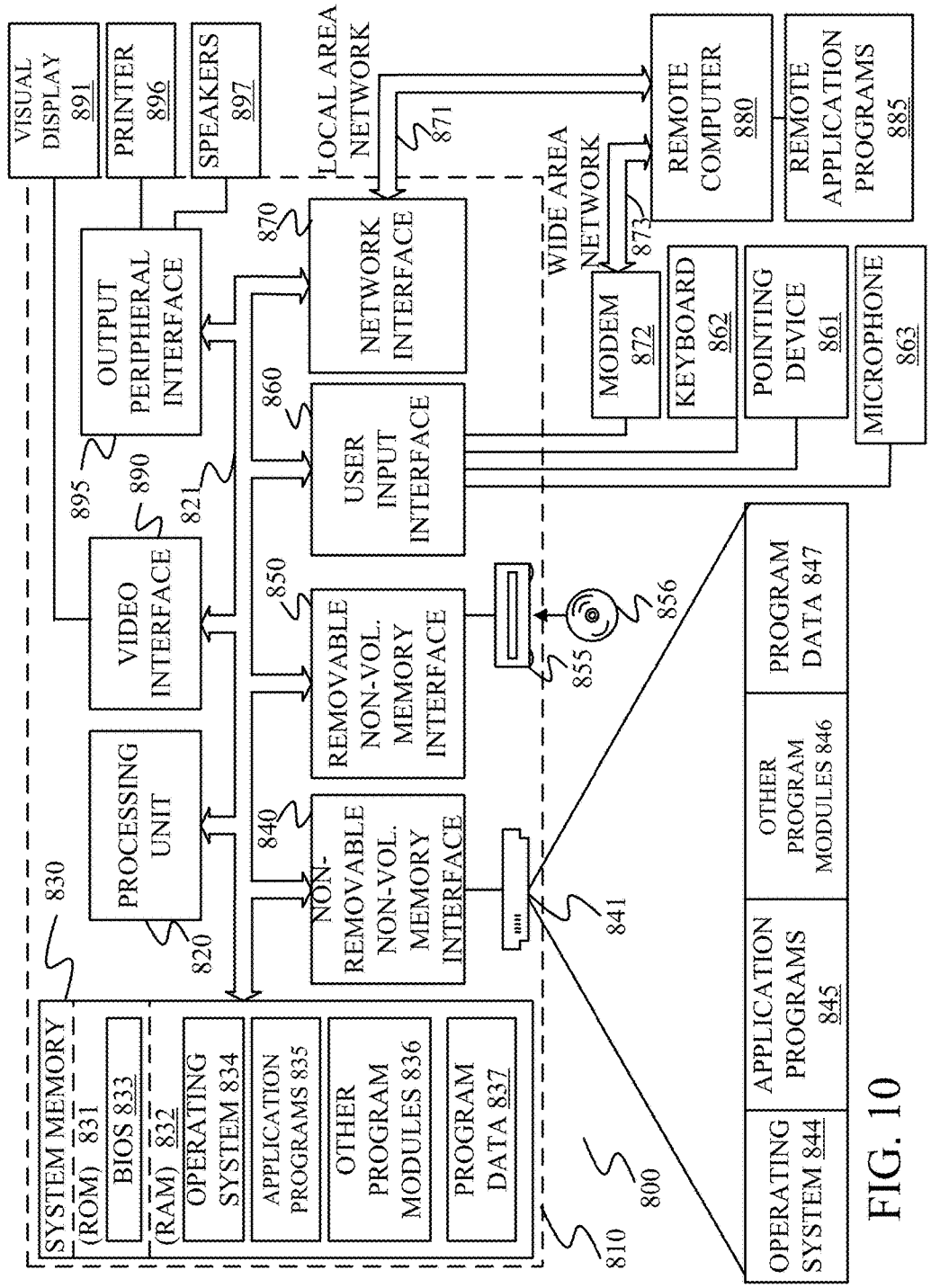
FIG. 10 is a block diagram of one example of a computing environment that can be used in the architectures shown in the previous figures.

FIG. 10 is one example of a computing environment in which architecture device 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a mobile computing device, comprising:

an application component that runs an application that generates content;

command set identifier logic that identifies a subset of commands, from a set of commands represented on a commanding surface of the application, based on a context of the application;

a contextual command bar generation system that generates a representation of a contextual command bar with a plurality of command actuators, each command actuator corresponding to a command in the subset of commands and being actuatable to execute the corresponding command, the representation of the contextual command bar including a palette link actuator that is actuated to navigate to the commanding surface;

a display device; and user interface logic that controls the display device to display the contextual command bar based on the representation of the contextual command bar.

Example 2 is the mobile computing device of any or all previous examples wherein the contextual command bar generation system comprises:

context identifier logic that identifies the context of the application.

Example 3 is the mobile computing device of any or all previous examples wherein the context identifier logic detects user selection of a content item in the content and identifies the context of the application based on the selected content item.

Example 4 is the mobile computing device of any or all previous examples wherein the context identifier logic is configured to detect a type of content item selected and to identify the context of the application based on the type of content item selected.

Example 5 is the mobile computing device of any or all previous examples wherein the context identifier logic is configured to identify a type of the application and to identify the context of the application based on the type of the application.

Example 6 is the mobile computing system of any or all previous examples and further comprising:

mode identifier logic that identifies whether a user is in a content consumption mode or a content authoring mode, the user interface logic only displaying the contextual command bar when the user is in the content authoring mode.

Example 7 is the mobile computing system of any or all previous examples and further comprising:

interaction processing logic that detects user interaction with the contextual command bar and performs an action based on the detected user interaction.

Example 8 is the mobile computing system of any or all previous examples wherein the interaction processing logic detects user actuation of a command actuator and, based on the detected user interaction, performs at least one of a direct action on the selected item of content, display of a gallery of additional command actuators, or navigate to an external experience, external to the application.

Example 9 is the mobile computing system of any or all previous examples wherein the contextual command bar generation system generates the representation of the contextual command bar including:

a horizontally scrollable command portion that includes the plurality of command actuators; and a fixed command portion that includes the palette link actuator.

Example 10 is the mobile computing system of any or all previous examples wherein the contextual command bar generation system generates the representation of the contextual command bar including:

a visual peek element that provides a visual cue indicating that the horizontally scrollable command portion is scrollable to reveal additional command actuators.

Example 11 is the mobile computing system of any or all previous examples wherein the application displays a keyboard and wherein the user interface logic controls the display device to display the representation of the contextual command bar along with the keyboard.

Example 12 is the mobile computing system of any or all previous examples wherein the command set identifier logic is configured to access a context-to-command mapping to identify the subset of commands based on the identified context of the application.

Example 13 is a mobile computing device, comprising:

an application component that runs an application that generates content;

context identifier logic that detects user selection of a content item in the content and identifies a context of the application based on the selected content item;

command set identifier logic that identifies a subset of commands, from a set of commands represented on a commanding surface of the application, based on a context of the application;

a contextual command bar generation system that generates a representation of a contextual command bar with scrollable command portion having a plurality of command actuators, each command actuator corresponding to a command in the subset of commands and being actuatable to execute the corresponding command, the representation of the contextual command bar including a fixed command portion with a palette link actuator that is actuated to navigate to the commanding surface;

a display device; and user interface logic that controls the display device to display the contextual command bar based on the representation of the contextual command bar.

Example 14 is the mobile computing device of any or all previous examples wherein the context identifier logic is configured to detect a type of the application and a type of the content item selected and to identify the context of the application based on the type of the application and a type of the content item selected.

Example 15 is the mobile computing device of any or all previous examples and further comprising:

mode identifier logic that identifies whether a user is in a content consumption mode or a content authoring mode, the user interface logic only displaying the contextual command bar when the user is in the content authoring mode.

Example 16 is a computer implemented method, implemented on a mobile computing device, the computer implemented method comprising:

running an application that generates content;

identifying a subset of commands, from a set of commands represented on a commanding surface of the application, based on a context of the application;

generating a representation of a contextual command bar with a plurality of command actuators, each command actuator corresponding to a command in the subset of commands and being actuatable to execute the corresponding command, the representation of the contextual command bar including a palette link actuator that is actuated to navigate to the commanding surface; and controlling a display device to display the contextual command bar based on the representation of the contextual command bar.

Example 17 is the computer implemented method of any or all previous examples and further comprising:

detecting user selection of a content item in the content; and identifying the context of the application based on the selected content item.

Example 18 is the computer implemented method of any or all previous examples wherein detecting user selection of a content item comprises detecting a type of content item selected and wherein identifying the context of the application comprises identifying the context of the application based on the type of content item selected.

Example 19 is the computer implemented method of any or all previous examples and further comprising:

identifying whether a user is in a content consumption mode or a content authoring mode, and controlling the display device to only display the contextual command bar when the user is in the content authoring mode.

Example 20 is the computer implemented method of any or all previous examples wherein generating the representation of the contextual command bar comprises:

generating a horizontally scrollable command portion that includes the plurality of command actuators; and generating a fixed command portion that includes the palette link actuator.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
an application component configured to run an application that generates content, the application comprising a set of commands represented on a commanding palette of the application, wherein the commanding palette:
groups the set of commands in a plurality of command groups according to types of application functionality in the application, wherein each command group:
is represented by a command group display element on the commanding palette, and
corresponds to a particular one of the types of application functionality,
wherein the command group display element is actuatable to display command actuators that represent commands in the command group;
command set identifier logic configured to:
identify a subset of commands, from the set of commands represented on the commanding palette of the application, based on a context of the application, wherein the subset of commands comprises:
a first command from a first one of the command groups that corresponds to a first type of application functionality, and
a second command from a second one of the command groups that corresponds to a second type of application functionality;
a contextual command bar generation system configured to:
generate a representation of a contextual command bar with a plurality of command actuators, each command actuator corresponding to a particular command in the subset of commands and being actuatable to execute the particular command, the representation of the contextual command bar including a palette link actuator that is actuatable to navigate to the commanding palette; and
user interface logic configured to:
control a display device to display the contextual command bar based on the representation of the contextual command bar; and
based on an indication of user actuation of the palette link actuator,
identify one of the command groups on the commanding palette based on a relevancy metric; and
generate the commanding palette with the display element that corresponds to the identified command group automatically selected to display the command actuators that represent the commands in the identified command group.

2. The computing device of claim 1 wherein the context identifier logic is configured to:
detect user selection of a content item in the content;
detect a type of the selected content item; and
identify the context of the application based on the type.

3. The computing device of claim 1 wherein the context identifier logic is configured to identify a type of the application and to identify the context of the application based on the type of the application.

4. The computing system of claim 1 and further comprising:
mode identifier logic configured to identify whether a user is in a content consumption mode or a content authoring mode, wherein the user interface logic is configured to only display the contextual command bar when the user is in the content authoring mode.

5. The computing system of claim 4 and further comprising:
interaction processing logic configured to detect user interaction with the contextual command bar and perform an action based on the detected user interaction.

6. The computing system of claim 5 wherein the interaction processing logic configured to:
based on detecting user actuation of a command actuator, perform at least one of:
a direct action on the selected item of content,
display of a gallery of additional command actuators, or
navigate to an external experience, external to the application.

7. The computing system of claim 1 wherein the contextual command bar generation system is configured to generate the representation of the contextual command bar including:
a horizontally scrollable command portion that includes the plurality of command actuators; and
a fixed command portion that includes the palette link actuator.

8. The computing system of claim 7 wherein the contextual command bar generation system is configured to generate the representation of the contextual command bar including:
a visual peek element that provides a visual cue indicating that the horizontally scrollable command portion is scrollable to reveal additional command actuators.

9. The computing system of claim 1 wherein the application is configured to display a keyboard, and wherein the user interface logic is configured to control the display device to display the representation of the contextual command bar along with the keyboard.

10. The computing system of claim 1 wherein the command set identifier logic is configured to access a context-to-command mapping to identify the subset of commands based on the identified context of the application.

11. A computing device, comprising:
a processor; and
memory storing instructions executable by the at least one processor, wherein the instructions, when executed, configure the computing device to:
run an application that generates content, the application comprising a set of commands represented on a commanding palette of the application, wherein the commanding palette;
groups the set of commands in a plurality of command groups; and
comprises a plurality of display elements, each display element corresponding to one of the command groups and being actuatable to display command actuators that represent the commands in the corresponding command group;
identify a subset of commands, from the set of commands represented on the commanding palette of the application;
generate a representation of a contextual command bar with a plurality of command actuators, each command actuator corresponding to a particular command in the subset of commands and being actuatable to execute the particular command, the representation of the contextual command bar including a palette link actuator that is actuatable to navigate to the commanding palette; and
based on an indication of user actuation of the palette link actuator, identify one of the command groups on the commanding palette based on a relevancy metric; and generate the commanding palette with the display element that corresponds to the identified command group automatically selected to display the command actuators that represent the commands in the identified command group.

12. The computing device of claim 11 wherein the context identifier logic is configured to detect a type of the application and a type of the content item selected and to identify the context of the application based on the type of the application and a type of the content item selected.

13. The computing device of claim 11 and further comprising:

mode identifier logic that identifies whether a user is in a content consumption mode or a content authoring mode, the user interface logic only displaying the contextual command bar when the user is in the content authoring mode.

14. A computer implemented method comprising:

running an application that generates content, the application comprising a set of commands represented on a commanding palette of the application, wherein the commanding palette:

groups the set of commands in a plurality of command groups; and comprises a plurality of display elements, each display element corresponding to one of the command groups and being selectable to display command actuators that represent the commands in the corresponding command group;

identifying a subset of commands, from the set of commands represented on the commanding palette of the application, based on a context of the application;

displaying a representation of a contextual command bar with a plurality of command actuators, each command actuator corresponding to a particular command in the subset of commands and being actuatable to execute the particular command, the representation of the contextual command bar including a palette link actuator that is actuatable to navigate to the commanding palette;

based on an indication of user actuation of the palette link actuator, identifying one of the command groups on the commanding palette based on a relevancy metric; and displaying the commanding palette with the display element that corresponds to the identified command group automatically selected to display the command actuators that represent the commands in the identified command group.

15. The computer implemented method of claim 14 and further comprising:

detecting user selection of a content item in the content; and identifying the context of the application based on the selected content item.

16. The computer implemented method of claim 15 wherein detecting user selection of a content item comprises detecting a type of content item selected and wherein identifying the context of the application comprises identifying the context of the application based on the type of content item selected.

17. The computer implemented method of claim 16 and further comprising:

identifying whether a user is in a content consumption mode or a content authoring mode, and controlling the display device to only display the contextual command bar when the user is in the content authoring mode.

18. The computer implemented method of claim 15 wherein generating the representation of the contextual command bar comprises:

generating a horizontally scrollable command portion that includes the plurality of command actuators; and generating a fixed command portion that includes the palette link actuator.

19. The computing device of claim 1, wherein the subset of commands includes a first command in a first one of the command groups and a second command in a second one of the command groups, and the contextual command bar comprises: a scrollable command portion having a plurality of command actuators, each command actuator corresponding to a command in the subset of commands and being actuatable to execute the corresponding command; and a fixed command portion with a palette link actuator that is actuated to navigate to the commanding palette.

* * * * *